(12) United States Patent
Roddier et al.

(10) Patent No.: US 8,471,396 B2
(45) Date of Patent: Jun. 25, 2013

(54) COLUMN-STABILIZED OFFSHORE PLATFORM WITH WATER-ENTRAPMENT PLATES AND ASYMMETRIC MOORING SYSTEM FOR SUPPORT OF OFFSHORE WIND TURBINES

(75) Inventors: Dominique Roddier, Berkeley, CA (US); Christian Cermelli, La Londe les Maures (FR)

(73) Assignee: Principle Power, Inc., Seattle, WA (US)

( * ) Notice: Subject to any disclaimer, the term of this patent is extended or adjusted under 35 U.S.C. 154(b) by 315 days.

(21) Appl. No.: 12/988,121

(22) PCT Filed: Apr. 6, 2009

(86) PCT No.: PCT/US2009/039692
§ 371 (c)(1),
(2), (4) Date: Oct. 15, 2010

(87) PCT Pub. No.: WO2009/131826
PCT Pub. Date: Oct. 29, 2009

(65) Prior Publication Data
US 2011/0037264 A1    Feb. 17, 2011

Related U.S. Application Data

(60) Provisional application No. 61/125,241, filed on Apr. 23, 2008.

(51) Int. Cl.
*F03D 9/00* (2006.01)
*H02P 9/04* (2006.01)
(52) U.S. Cl.
USPC .......................................................... 290/44

(58) Field of Classification Search
USPC ................... 290/44, 55; 405/224, 205, 195.1
See application file for complete search history.

(56) References Cited

U.S. PATENT DOCUMENTS

| 7,086,809 B2 * | 8/2006 | Busso ........................... 405/203 |
| 7,156,037 B2 | 1/2007 | Borgen ......................... 114/264 |
| 7,242,107 B1 | 7/2007 | Dempster ........................ 290/55 |
| 7,281,881 B1 * | 10/2007 | Cermelli et al. ............. 405/203 |
| 2008/0014025 A1 | 1/2008 | They ............................. 405/224 |

FOREIGN PATENT DOCUMENTS

| EP | 2143629 | 1/2010 |
| WO | 0287959 | 11/2002 |

OTHER PUBLICATIONS

Supplementary European Search Report, European Application No. 09734886 completed Jan. 23, 2013, pp. 1-4.

* cited by examiner

*Primary Examiner* — Javaid Nasri
(74) *Attorney, Agent, or Firm* — Dergosits & Noah LLP

(57) ABSTRACT

A floating wind turbine platform includes a floatation frame that includes at least three columns that are coupled to each other with horizontal main beams. A wind turbine tower is mounted above a tower support column to simplify the system construction and improve the structural strength. The turbine blades are coupled to a nacelle that rotates on top of the tower. The turbine's gearbox generator and other electrical gear can be mounted either traditionally in the nacelle, or lower in the tower or in the top of the tower-supporting column. The floatation frame includes a water ballasting system that pumps water between the columns to keep the tower in a vertical alignment regardless of the wind speed. Water-entrapment plates are mounted to the bottoms of the columns to minimize the rotational movement of the floatation frame due to waves.

31 Claims, 13 Drawing Sheets

COLUMN-STABILIZED OFFSHORE PLATFORM WITH WATER-ENTRAPMENT PLATES AND ASYMMETRIC MOORING SYSTEM FOR SUPPORT OF OFFSHORE WIND TURBINES

CROSS REFERENCE TO RELATED APPLICATIONS

This patent application claims priority to U.S. Provisional Patent Application No. 61/125,241, titled "Column-Stabilized Offshore Platform With Water-Entrapment Plates And Asymmetric Mooring System For Support Of Offshore Wind Turbines" filed Apr. 23, 2008, the entire contents of which are hereby incorporated by reference.

BACKGROUND

A wind turbine is a rotating machine which converts the kinetic energy from the wind into mechanical energy that is then converted to electricity. Wind turbines have been developed for land based installations as well as offshore installations. The land based wind turbines are fixed to the ground and located in windy areas. There are vertical axis wind turbines that have the main rotor shaft arranged vertically and horizontal axis wind turbines that have a horizontal rotor shaft that is pointed into the wind. Horizontal axis wind turbines generally have a tower and an electrical generator coupled to the top of the tower. The generator may be coupled directly or via a gearbox to the hub assembly and turbine blades.

Wind turbines have also been used for offshore applications. Single tower offshore systems are mounted into the sea bed and limited to shallow water depths up to 30 meters. If the turbine tower is mounted on a wider base, such as a lattice structure, this shallow depth requirement can be extended to 50 m. In deeper water, only floating systems are expected to be economically feasible. The drawback of shallow water systems is that the water is typically only shallow close to shore. Thus, wind turbines close to shore can block the shore view and create navigational obstructions and potential hazards for water vessels and aircraft.

Currently, there are a number of concepts for offshore floating wind turbine platforms being developed. Generally, these fall into three main categories: Spars; Tension Leg Platforms (TLP's); and semi-submersible/hybrid systems. Examples of floating wind turbine platforms include the Statoil Norsk-Hydro Hywind spar, (FIG. 1), the Blue H TLP recent prototype (FIG. 2), the SWAY spar/TLP hybrid (FIG. 3), the Force Technology WindSea semi submersible (FIG. 4) and the Trifloater semi submersible (FIG. 5). With reference to FIG. 1, spars are elongated structures that are weighted with significant ballast at the bottom of the structure and buoyant tanks near the waterline. For stability purposes, the center of gravity must be lower than the center of buoyancy. This will insure that the spar will float upright. The spar is moored to the sea floor with a number of lines that hold the spar in place. In general terms, spar type structures have better heave performance than semi-submersibles due to the spar's deep draft and reduced response to vertical wave exciting forces. However, they also have more pitch and roll motions than the other systems, since the water plane area which contributes to stability is reduced in this design.

With reference to FIG. 2, TLPs have vertically tensioned cables or steel pipes that connect the floater directly to the sea bed. There is no requirement for a low center of gravity for stability, except during the installation phase, when buoyancy modules can be temporarily added to provide sufficient stability The TLPs have very good heave and angular motions, but the complexity and cost of the mooring installation, the change in tendon tension due to tidal variations, and the structural frequency coupling between the tower and the mooring system, are three major hurdles for TLP systems.

When comparing different types of offshore wind turbine structures, wave and wind induced motions are not the only elements of performance to consider. Economics play a significant role. It is therefore important to carefully study the fabrication, installation, commissioning/decommissioning costs and ease of access for maintenance methodologies. Semi-submersible concepts with a shallow draft and good stability in operational and transit conditions are significantly cheaper to tow out, install and commission/decommission than spars, due to their draft, and TLPs, due to their low stability before tendon connection.

SUMMARY OF THE INVENTION

Semi-submersible offshore floating wind turbine platforms that include at least three columns are described herein. In addition to at least three columns, the wind turbine platforms described herein include additional features that improve the performance of the wind turbine platform. In an embodiment represented in FIG. 6, the floating wind turbine platform includes an active ballast system that moves water ballast between the columns to keep the tower vertically aligned. Moreover, an alignment sensor can be coupled to the platform to determine the wind loading. Even further, wind turbine platform according to the present description may include one or more additional features, such as an asymmetric mooring system and an active ballast system that facilitate production of a structure that can not only withstand environmental loads, but is also relatively light weight when compared to other platform designs and can lead to better economics for energy production.

The columns included in the platforms described herein can be coupled to each other with a tubular truss system that includes horizontal and vertical bracing beams. A horizontal water-entrapment plate is attached to the bottom portion of some or all of the columns. The wind turbine tower is subjected to considerable wind loads very high on the structure, and spacing between columns achieves stability. In an embodiment, as illustrated in FIG. 6, the turbine tower is attached to the top of one of the columns, which is itself coupled to the other columns by the main beams. This construction improves the structural efficiency of the floating wind turbine platform and allows the structure to be of a relatively light weight.

In another embodiment, illustrated in FIG. 7, the turbine tower is coupled directly above a buoyancy column that supports the weight of the tower and wind turbine components. In this embodiment, the other columns function to stabilize the platform and keep the tower in a vertical alignment. Further, an active buoyancy system can be used to move ballast between the columns. In the embodiment shown in FIG. 7, because the weight of the tower is not supported by the buoyancy of the outer columns, the platform does not require as much structural support between the outer columns and the center tower column. In contrast, in some previous designs where the tower is positioned at the center of the deck, the structure is relatively heavy and potentially less economically feasible because, due to the weight of the tower and turbine and the aerodynamic moment, the structure must support large loads at the middle of a long structure.

A nacelle, which can house, for example, one or more of a pitch control system, gear box, yaw controller and generator, can be mounted on top of the tower and provides support to the hub and turbine blades that extend from the hub. The hub can include a mechanism that allows the pitch of the turbine blades to be adjusted so that the rotational speed of the turbine blades is constant over a normal wind speed range. The nacelle can be coupled to a yaw control system, which points the turbine blades directly into the wind for optimum efficiency. Wind turbine equipment, such as the gear box and electrical generator, that are typically positioned within the nacelle may reside there, or they may be positioned lower in the tower or on top of column. Direct drive turbines, which do not have a gear box, may also be used with the platforms described herein. The electrical power produced by the generator can be in a random frequency and amplitude due to the variable wind speed. The electrical power can be altered with a transformer, inverter and a rectifier to produce a uniform output voltage and current. These electrical components can be located in the nacelle, at the bottom of the tower or on another column. The electrical output from the wind turbine can be transmitted through an electrical cable that runs to the sea floor and a power station. Rather than running straight to the sea floor, a portion of the cable can be coupled to buoyancy mechanisms that elevate the portion of the cable. The cable may then have a curved path, which allows the floating wind turbine platform to move vertically or horizontally with the waves, current and tides without putting any significant additional tension on the cable.

In an embodiment, the floating wind turbine platform has a special configuration that is a high strength structure. The main beams mounted between the columns are equal in length and form substantially an equilateral triangle. Horizontal bracing cross beams are coupled between the adjacent main beams at approximately one third the length of the main beams. The horizontal bracing cross beams and main beams form additional equilateral triangles at the three corners of the triangle formed by the main beams. Vertical bracing beams are coupled between the mid sections of the columns and one third the length of the main beams. The triangles formed by the vertical bracing beams, columns and main beams are substantially right isosceles triangle. This configuration provides a strong structure that can support the required load forces while minimizing the amount of material to build the floating wind turbine platform.

In specific embodiments, a floating wind turbine platform as described herein can be designed to be fabricated and assembled entirely at quayside. For example, a crane can be used to assemble components of the floating wind turbine platform that can be completely constructed at the quayside assembly site. Additionally, where desired, the wind turbine components can be assembled and integrated with the platform and substructure at quayside. Once fully assembled, the ballast can be completely removed from the columns of the floating wind turbine platform so the structure can be floated out of a channel to the installation site. If additional buoyancy is needed to reduce the draft to get out of a channel, a buoyancy module can be attached to one or more of the columns to reduce the draft. Once the platform has reached deeper water, the buoyancy module can be removed and the columns can be partially filled with water ballast to stabilize the platform.

Sea anchors can be secured to the sea floor prior to towing the floating wind turbine platform to the installation site. When the floating wind turbine platform is moved into position, the mooring lines can be fastened to the columns and tightened to a predetermined tension. In an embodiment, the tower is mounted over one of the columns and the mooring lines are arranged in an asymmetric manner, with more of the mooring lines coupled to the column supporting the turbine tower than to the other columns. For example, if four mooring lines are used, two of these lines are connected to the column supporting the tower at an approximately 90-degree angle interval and one line is connected to each of the remaining columns. By way of another example, if six mooring lines are used, four mooring lines can be connected to the tower supporting column at approximately 60-degree angle intervals about a 180 degree range and each of the other columns is coupled to a single mooring line. The angles of the mooring lines can be configured to intersect at the tower column. If a symmetric floating wind turbine platform is used, the mooring lines can be coupled to the platform in a symmetrical manner. For example, a total of six mooring lines can be used with two mooring lines coupled to each of the columns.

The mooring lines can be conventional catenary-shaped lines composed of a combination of chain, wire ropes and drag-embedment anchors. Alternatively, the mooring lines can be composed of taut polyester sections, and also include clump weights, which are heavy masses suspended to sections of the mooring system. In an embodiment, the anchors are embedded into the sea floor and a section of chain is coupled to the anchors. Polyester line can be attached to the chain to provide some elasticity to the mooring line. Where used, the opposite end of the polyester line can be coupled to an additional length of chain that is attached to one or more tensioning mechanisms on each of the columns. Heavy clump weights can be attached to the chains that are connected to each of the columns to lower the angle of the chains to the columns, and the mooring lines can be tensioned by mechanisms coupled to each of the columns.

If the wind turbine and tower are mounted on one of the three columns, one column supports more weight and the hull is asymmetrically balanced when there is no wind. However, the wind force against the turbine blades and tower cause a moment against the tower that normally pushes the tower away from the center of the platform. This moment applies a downward force on the tower supporting column while reducing the downward force on the independent columns that do not support the tower.

When the wind turbine is installed, the wind turbine will spin and the generator will produce electricity. However, the wind speed and direction can change frequently. Therefore, in certain embodiments, a turbine utilized on a platform according to the present description can be provided with a wind direction system including a wind direction sensor and a yaw control system. In such an embodiment, the wind direction sensor will detect shifts in the wind direction and the yaw control system will rotate the nacelle (yaw) at the top of the tower to align the turbine blades with the wind direction. Even further, a turbine utilized on a platform according to the present description can be provided with a wind speed sensor that detects changes in the wind speed and is coupled to a turbine pitch control system that responds to changes in wind speed by inducing a change in the pitch of the turbine blades to optimize the output power or minimize the wind drag forces on the turbine blades. Examples of commercially available wind direction and speed sensors are available from Campbell Scientific Ltd., United Kingdom and NovaLynx Corp., USA.

As the wind speed increases against the tower and turbine blades, the wind force can cause the entire floating wind turbine platform to lean out of vertical alignment. In order to compensate for the wind forces (thrust), a wind turbine platform according to the present description is provided with an internal ballast system that utilizes water pumps to move water between each of the columns. In an embodiment, the internal ballast system includes one or more alignment sensors coupled to a controller that controls the water pumps of the ballast system. If an alignment sensor detects that the floating wind turbine platform is leaning towards one of the columns, the internal ballast system can pump water out of the low floating column and into the other columns to increase the buoyancy of the low column and reduce the buoyancy of the other columns. This water movement will raise the low floating corner of the platform so that the tower is returned to a vertical alignment. When the alignment sensor detects that the vertical alignment is re-established, the pumps can be stopped. Because it is only necessary to compensate for overturning moment applied to the structure, in one embodiment of the internal ballast system, there is no need to pump additional water from the outside, and the internal ballast system can function in a closed loop.

Because operation of the internal ballast system requires pumping of a substantial amount of water, the response time for achieving a desired ballast adjustment may be as long as 15-30 minutes. In an embodiment, the alignment sensor can be two gyroscopes that can sense rotational movement about the X and Y axis in the horizontal plane. In perfect vertical alignment, the X and Y axis gyroscopes will not detect any rotation of the platform. However, if there is any tilting of the floating wind turbine platform, the X and/or Y axis gyroscopes can detect rotational movement. Such an alignment sensor can be coupled to a controller that responds to the misalignment by pumping water to the columns as necessary to correct the vertical alignment error. In an embodiment, the ballast system is a closed system that completely isolates the ballast water from the surrounding sea water. In such an embodiment, because the seawater cannot enter the columns, the columns cannot be flooded and the platform cannot capsize due to a malfunction of the ballast system.

In an embodiment, the turbine control system and the ballast system are coupled so the tower can be vertical but the ballast pump may still need to function until the turbine is in an optimal power production mode. In this case the turbine blade pitch is modified to reduce the thrust and keep the mast vertical. The blade pitch can then be slowly rotated back to its optimal angle as the ballast water is pumped from one column to the next.

The wind turbine platforms described herein can be used as a standalone platform or, alternatively, the platforms described herein can be positioned as part of a plurality of floating wind turbine platforms arranged in a wind farm. The electrical power from each of the wind turbines can be combined and transmitted through a single cable towards a power station which can be on land or on a separate floating platform. In one such embodiment, one of the platforms can be used for crew or maintenance quarters. This can provide a safe sheltered area where workers can be protected from severe ambient weather conditions.

If a floating wind turbine platform as described herein needs to be returned to docks for servicing or decommissioning, the platform can be disconnected from the mooring lines and power cable and towed to the quayside assembly site. In shallow water channels the fixed water ballast can be pumped out so the platform draft is reduced to its transit draft. If necessary, one or more buoyancy modules can be coupled to the columns if the transit draft needs to be further reduced.

DETAILED DESCRIPTION

Figure 6:
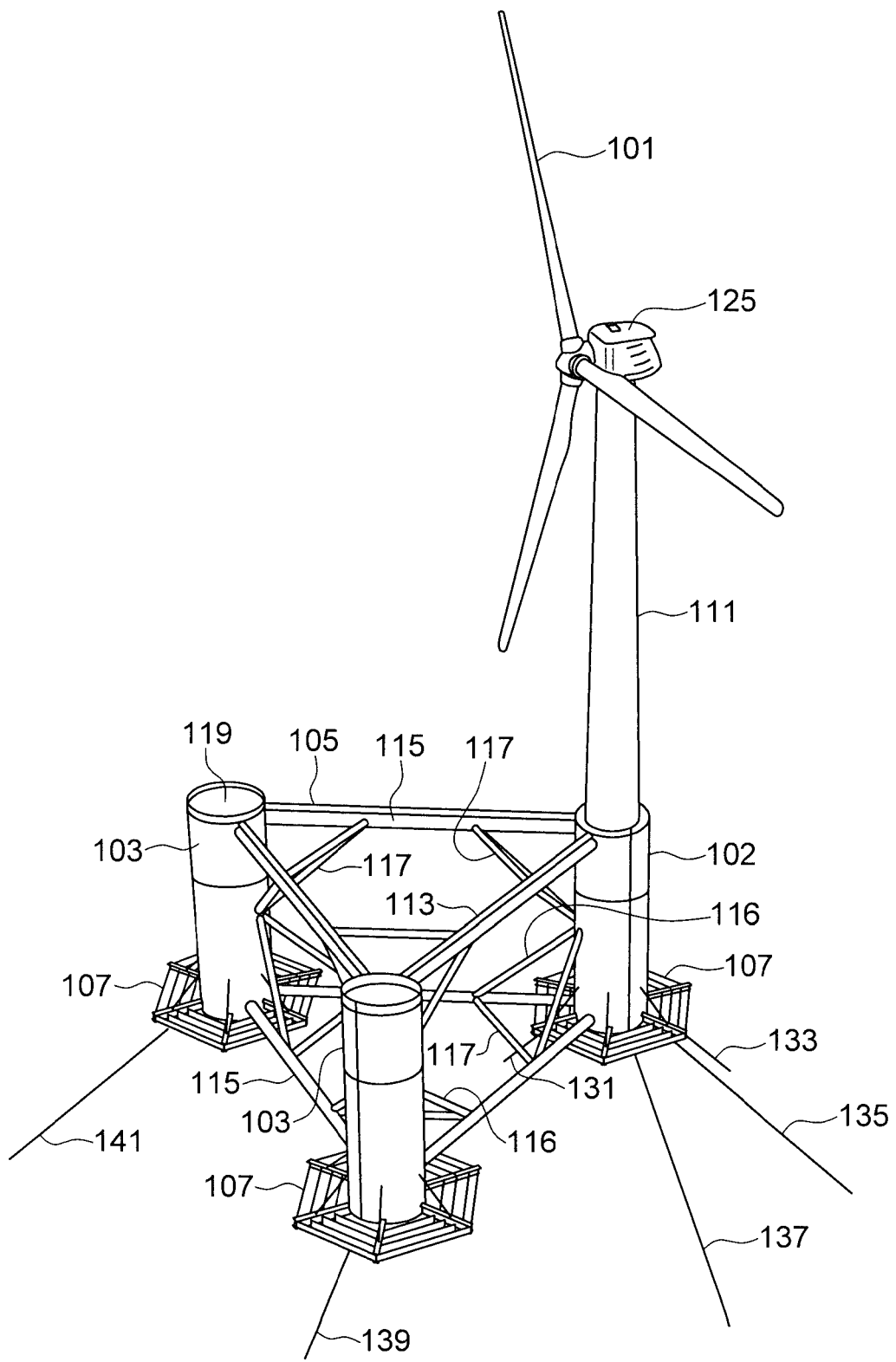
FIG. 6 illustrates an asymmetric semi submersible floating wind turbine platform.

Semi-submersible, floating wind turbine platforms are described herein. The platforms described herein can be used, for example, in offshore wind turbine installations. With reference to FIG. 6, wind turbine system according to the present description can include an offshore platform 105 having at least three columns 102, 103. A planar water-entrapment plate 107 is attached to the bottom portion of each column 102, 103. In an embodiment, the columns 102, 103 are cylindrical in shape. However, the columns can be configured in any shape suitable for constructing a wind turbine platform. A wind turbine tower 111 is positioned directly above a stabilizing column 102. The two independent stabilizing columns 103 that do not support the turbine tower 111 are separated by an angle that can range from about 40 to 90 degrees from the tower supporting column 102. While the platform 105 shown in the illustrations includes three columns 102, 103, in other embodiments, the platform can include four or more columns.

The columns 102, 103 are interconnected with a truss structure composed of main beams 115, bracing beams 116 and cross beams 117. The main beams 115 are connected to the tops and bottoms of the columns 102, 103 and bracing beams 116 that are connected coupled between the main beams 115 and columns 102, 103. The cross beams are connected between the adjacent main beams 115. In an embodiment, the main beams 115 can be configured such that they intersect with the three columns 102, 103 and form an equilateral triangle. Similarly, the horizontal bracing beams 117 and main beams 115 can be configured to form additional equilateral triangles. In an embodiment, the vertical bracing beams 116 are coupled to the columns 102, 103 at approximately the middle of the height and coupled to the main beams 115 at points that are approximately one third the main beam length. The main beams 115, columns 102, 103 and vertical bracing beams 116 can form right isosceles triangles. In an embodiment, the main beams 115, vertical bracing beams 116 and horizontal bracing beams 117 are preferably hollow tubular structures of circular or rectangular cross sections. Alternatively, the main beams 115, vertical bracing beams 116 and horizontal bracing beams 117 can also be solid I, H or T beams. In other embodiments the three columns 102, 103, bracing beams 116 and horizontal bracing beams 117 can form any other types of geometric configurations suitable for achieving a platform exhibiting desired strength, weight, load bearing or other performance characteristics.

This design of a floating wind turbine platform as described herein provides an strong and efficient structure. The strength can be attributed to the tetrahedron structures formed at corners of the platform by the columns, main beams, vertical bracing beams and horizontal bracing beams. A load analysis of the structure shows that any deformation is most likely to occur in the middle sections of the main beams 115 between the adjacent tetrahedrons. While the geometry of the structure is very efficient, the strength of the structure can also be increased, for example, by increasing the outside diameter or wall thicknesses of the main beams 115, vertical bracing beams 116 and horizontal bracing beams 117. If the main beams 115, vertical bracing beams 116 and horizontal bracing beams 117 are tubular structures, the fatigue life of the structure can be substantially extended by increasing the wall thickness. For example, if the wall thickness of the tubes is double the nominal tube wall thickness, the fatigue life of the structure may be increased by approximately 10 to 20 times the fatigue life of the nominal tube wall thickness structure. Wall thickness may be increased in a short section near the intersections of main beams 115 with the vertical bracing beams 116 and the horizontal bracing beams 117.

In an embodiment, the diameter or width of the base of the turbine tower 111 approximates but is slightly smaller than the diameter or width of the column 102 upon which it is positioned. This uniformity maximizes the continuity of the structure and minimizes the stress concentrations in the critical areas of the platform 105 structure. The stress concentrations can be highest at the junction of the turbine tower 111 and column 102 upon which the turbine tower 111 is positioned, where bending moments are highest due to wind-induced moments and where the main beams 115 connect to the other stabilizing columns 103. In one embodiment, the diameter of the columns 102, 103 may be uniform to create a straight structure, such as a straight cylindrical structure, while the tower 111 can be larger at the base and taper to a smaller diameter or width at the top. The columns 102, 103 can be constructed by welding a number of uniform diameter tubular sections together while the tower 111 can be constructed by bolting and/or welding a series of tapered sections together. The columns 102, 103 and the tower 111 can be strengthened with internal structures such as plates, ribs and internal flanges.

Because the columns 102, 103 only provide buoyancy and stability for the floating wind turbine platform, only minimal deck space 119 is required between the tops of the columns 103. Narrow gangways can be placed on top of the upper main beams 115, connecting each of the columns 102, 103. Additional areas on the platform 105 may be used to support secondary structures, such as auxiliary solar cells or support of wave energy converters, and to provide access around the wind turbine tower 111. In one embodiment, the decks 119 are positioned on top of one or more stabilizing columns 102, 103, and the stabilizing column and decks 119 are configured such that the highest expected wave crests will not reach or damage the deck equipment or the turbine blades 101. Stairs and a boat docking structure can be attached to any of the columns 102, 103. The platform 105 can be secured to the sea floor by mooring lines 131-141 attached to the bottoms of the columns 102, 103.

The turbine blades 101 are long in length and narrow in width having a very high aspect ratio. The turbine blades 101 are connected at their base to a hub, a motor and actuators can change the pitch of the blades 101. The pitch of the blades 101 can be set to optimize the electrical power output of the generator. This can be accomplished by adjusting the pitch of the blades to maintain a constant speed of rotation over a range of wind speeds. At lower wind speeds, the pitch of the turbine blades is lower so that they can maintain a maximum rotational speed. In contrast, at higher wind speeds the pitch is increased to prevent the rotation from exceeding the optimum rate of rotation. In order to sense the true wind speed, the wind turbine can include a wind anemometer that detects the wind speed and a controller can adjust the pitch of the turbine blades 101 to the proper pitch angle based upon the detected wind speed. Commercial turbine blade pitch control systems are available from LTi REEnergy, Germany and Bosch Rexroth, Germany.

Accurately aligning the turbine blades 101 in an orientation perpendicular to the wind direction leads to generation of maximum electrical power. To facilitate such positioning, the wind turbine may include a wind direction system that includes, for example, a wind direction sensor that detects any misalignment and a yaw control system Commercial inclination sensors are available from Pepper+Fuches, Germany and MicroStrain, Inc. USA. If an angular offset is detected by the wind direction sensor, the controller can actuate a yaw motor that rotates the nacelle, hub and turbine blades 101. In an embodiment, the turbine blades 101 and hub are coupled to a gear box that increases the rotational speed of the turbine blades 101 to a speed suitable for generating electricity. The gearbox increases the rotational speed of a drive shaft that is coupled to a generator which produces electricity. In another embodiment, a direct drive turbine is used. There is no gearbox and the drive shaft is coupled directly to the generator, which may reside in the nacelle or in the tower.

The electrical output generally increases with wind speed. However, a minimum wind velocity of about 3 meters per second is typically required to cause the turbine blades to rotate. For a typical wind turbine generator, power output will continue to increase with increases in wind speed up to about 12 meters per second, and in a wind range of wind speeds 6-12 meters per second, the turbine blades are pitched to optimize the electrical energy production. At wind speeds higher than 12 meters per second, the turbine blades of a typical wind turbine generator are adjusted to control the lift force and let the turbine rotate at its optimum speed, hence maintaining the maximum power output. A 5 megawatt turbine generator may reach a maximum power output at a wind speed of about 12 meters per second. At higher wind speeds between about 12 to 25 meters per second, the generator will produce 5 megawatts of electrical energy, but the turbine blades are rotated at a higher pitch angle to reduce the wind force loads on the turbine blades and maintain the optimal speed of rotation. At wind speeds greater than about 25 meters per second, the wind turbine system may be shut down and parked. The turbine blades are adjusted to minimize the wind forces and may also be locked down until the wind speed drops to prevent overspeed and damage to the wind turbine.

Figure 7:
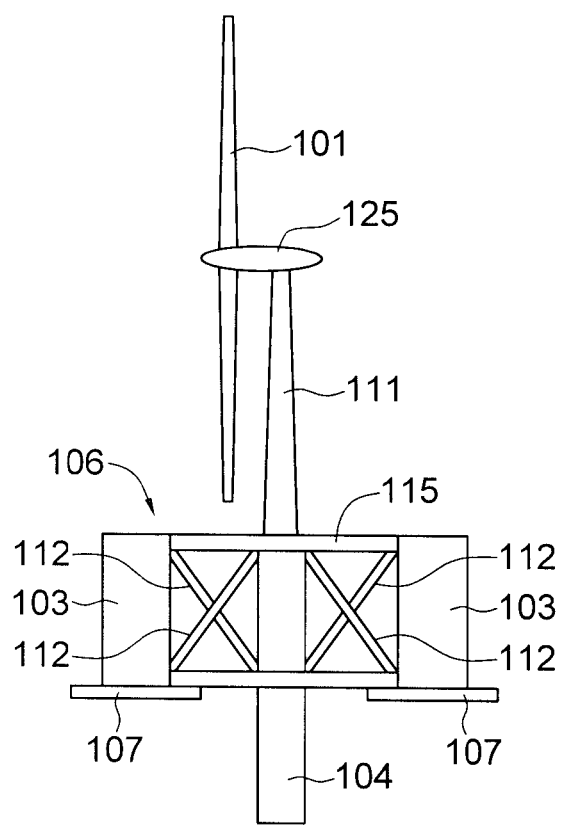
FIG. 7 illustrates an elevation view of a semi submersible floating wind turbine platform.
Figure 8:
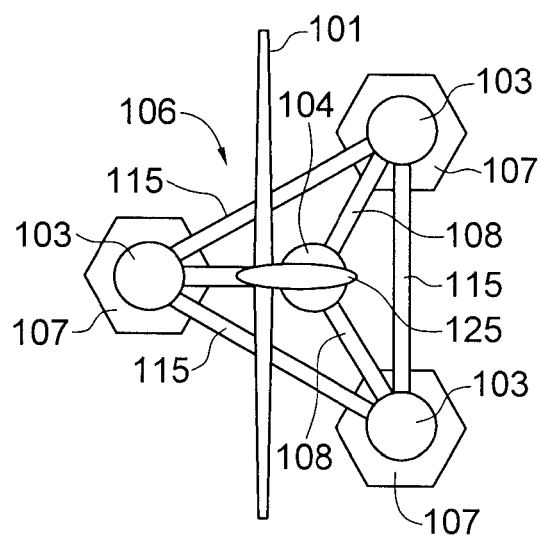
FIG. 8 illustrates a top view of a semi submersible floating wind turbine platform.

While the floating wind turbine platform has, thus far, been illustrated in an asymmetric tower placement, in other embodiments the tower is located symmetrically between the columns. With reference to FIGS. 7 and 8, a floating wind turbine platform 106 is illustrated with the tower 111 located symmetrically between the columns 103. FIG. 7 illustrates an elevation view of the floating wind turbine platform 106, and FIG. 8 illustrates a top view of the floating wind turbine platform 106. In this embodiment, the tower 111 is mounted over a buoyancy column 104. The buoyancy column can be a hollow structure which provides some or all of the buoyant force required to support the weight of the tower 111, the nacelle 125, the turbine blade 101 and other system components. Because the buoyancy column 104 is mostly hollow and displaces a large volume of water, it is unstable. In order to stabilize the floating wind turbine platform 106, the buoyancy column 104 is coupled to three of more stabilizing columns 103 that include a ballast system to stabilize the tower 111. The floating wind turbine platform 106 can have support beams 108 that extend between the stabilizing columns 103 and the buoyancy column 104 as well as bracing support beams 112 that extend between the stabilizing columns 103 and the buoyancy column 104. Other structural details of the floating wind turbine platform are the same as described above with reference to FIG. 6.

Figure 9:
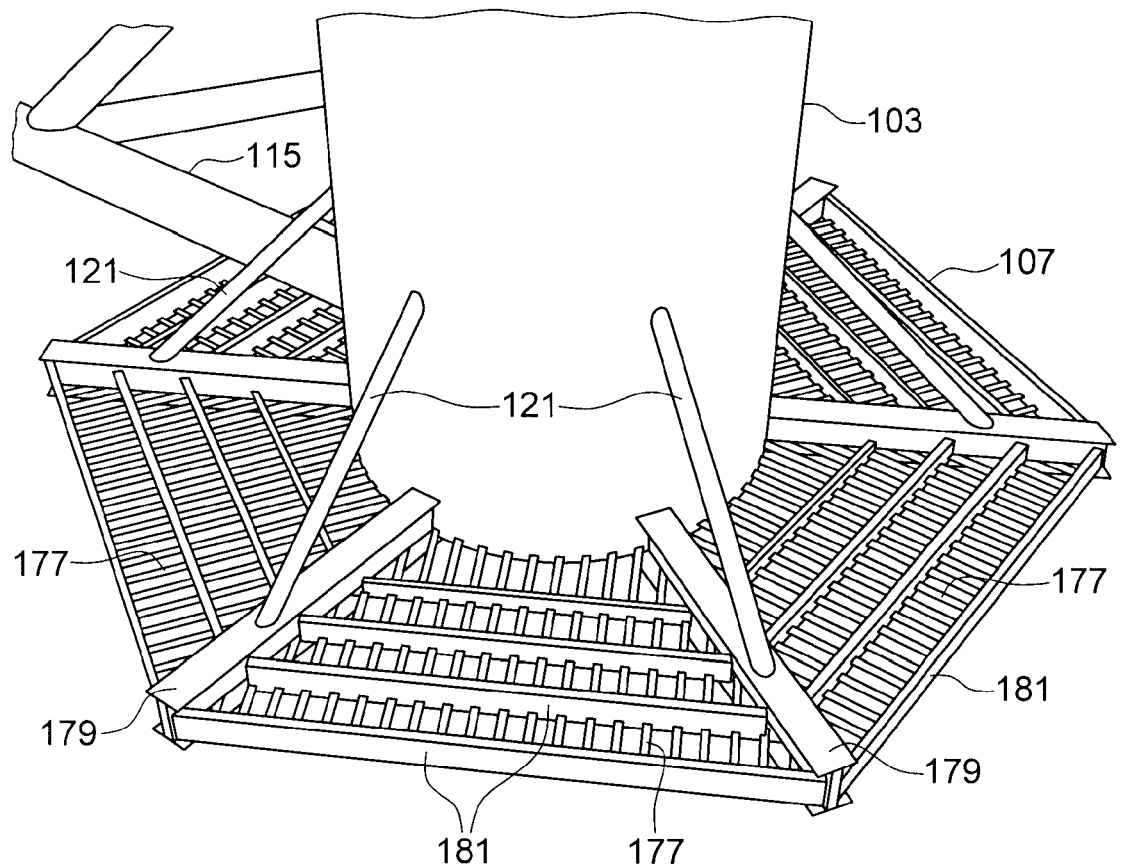
FIG. 9 illustrates a water-entrapment plate connected to the bottom of the floating wind turbine platform.

The wind turbine platforms described herein include one or more horizontal water-entrapment plates 107 attached to the bases of each of one or more of the platform columns. The one or more water-entrapment plates 107 are positioned such that they are submerged. With reference to FIG. 9, the function of the water-entrapment plate 107 is to provide hydrodynamic added-mass and damping. The amount of water "entrained" by a square plate with side length $\lambda$ moving along its normal direction is approximately equal to $\rho\lambda^3$ where $\rho$ is the water density. A large amount of entrained water also known as hydrodynamic added-mass is therefore associated with a square horizontal plate of substantial dimensions moving vertically. A rectangular plate with a large aspect ratio will entrain much less water relative to its area.

The shape and dimensions of the water-entrapment plate 107 are such that they cause a substantial increase of the platform added-mass in heave and added-moment of inertia in roll and pitch. Since the platform draft is relatively shallow, typically 100 feet or less, wave-exciting forces on the water-entrapment plate cannot be neglected. Hydrodynamic calculations should be conducted to determine the response of the platform, taking into account the increase in added-mass and wave exciting forces. Commercial diffraction-radiation software, such as WAMIT, may be used to compute floating platform responses. In a hypothetical example, a 15,000 tons displacement platform carrying over 7,000 tons payload was considered for these response computations. Without water-entrapment plates, the platform's natural period is around 12 seconds, which corresponds to a frequency band with considerable amount of energy during big storms. The resulting resonant response yields unacceptable platform motion, resulting in damage to the platform structure. By adding the one or more water-entrapment plates, which, in one embodiment, extend radially outward by about 20 to 30 feet from a column base, the platform's heave natural period can be significantly extended to 20 seconds, which results in acceptable motion response.

Therefore, the one or more water-entrapment plates 107 provided in a platform as described herein can provide a substantial increase in vertical added-mass, while minimizing the increase in wave exciting force, resulting in a beneficial reduction of platform motion. Such a stabilizing effect is especially beneficial for small platforms for which suitable performance cannot be obtained merely by adjusting column size and spacing. The positioning of the one or more water-entrapment plates 107, such as the radial distance of a plate from the center of a given column 102, 103, and the configuration of the one or more water-entrapment plates 107, such as the total plate area, can be adjusted to achieve, for example, a desired increase in the vertical added-mass and a reduction or minimization of the increase in wave exciting force.

Due to its size, a water-entrapment plate 107 attracts large hydrodynamic loading including added-mass and wave radiation effects, wave exciting forces and viscous effects due to shedding of vortices from the edges of the plate 107. The plate 107 must be supported by additional structural members in order to withstand extreme wave loading as well as fatigue damage due to the large number of wave cycles it is subjected to. In an embodiment, radial stiffeners 179 extend from the columns 103 toward the plate's outer edges to support the plate 107. Main beams 115 connected to the columns 103 also provide structural support to the water-entrapment plate 107, as well as rigidity to the overall structure. Additional plate 107 strengthening components can include, for example, girders 181 supported by radial stiffeners 179, stringers 177 between the girders 181 and water-entrapment plate bracings 121 mounted between a column 102 and the stiffeners 179. These structural members support the panels forming the water-entrapment plate 107. The entrapment plates described herein can be formed of any suitable material, such as steel.

In order to properly dimension the water-entrapment plate stiffeners, the various hydrodynamic effects taking place on the plate must be properly accounted for. These consist of the following: inertia of the fluid surrounding the water-entrapment plate causing a force opposing the acceleration of the platform, particularly in the vertical direction; radiated waves generated by the platform as it moves resulting in energy being removed from the platform; incident waves interact with the platform hull causing forces; and viscous effects, predominantly due to the shedding of vortices from the plate edges also resulting in transfer of energy from the platform to the water. All forces, except the viscous forces, can be modeled based on the diffraction-radiation theory which neglects the fluid viscosity, and require numerical solution of the Laplace equation. Viscous effects are determined from an empirical model developed with small-scale laboratory experiment results. The hydrodynamic forces can be converted to a pressure field on the platform's submerged portion, including the water-entrapment plate, and a structural finite-element model can then be run to determine stresses in all structural members including stiffeners and plating. Finite-element models require discretization of the hull into small elements on which the beam and/or plate theory can be applied. A numerical solution can be obtained providing stress levels on the hull. Proper sizing of the hull, including the water-entrapment plate can then be confirmed. Additional information about the water-entrapment plates is disclosed by U.S. Pat. Nos. 7,086,809 and 7,281,881 which are both hereby incorporated in their entirety by reference.

Figure 10:
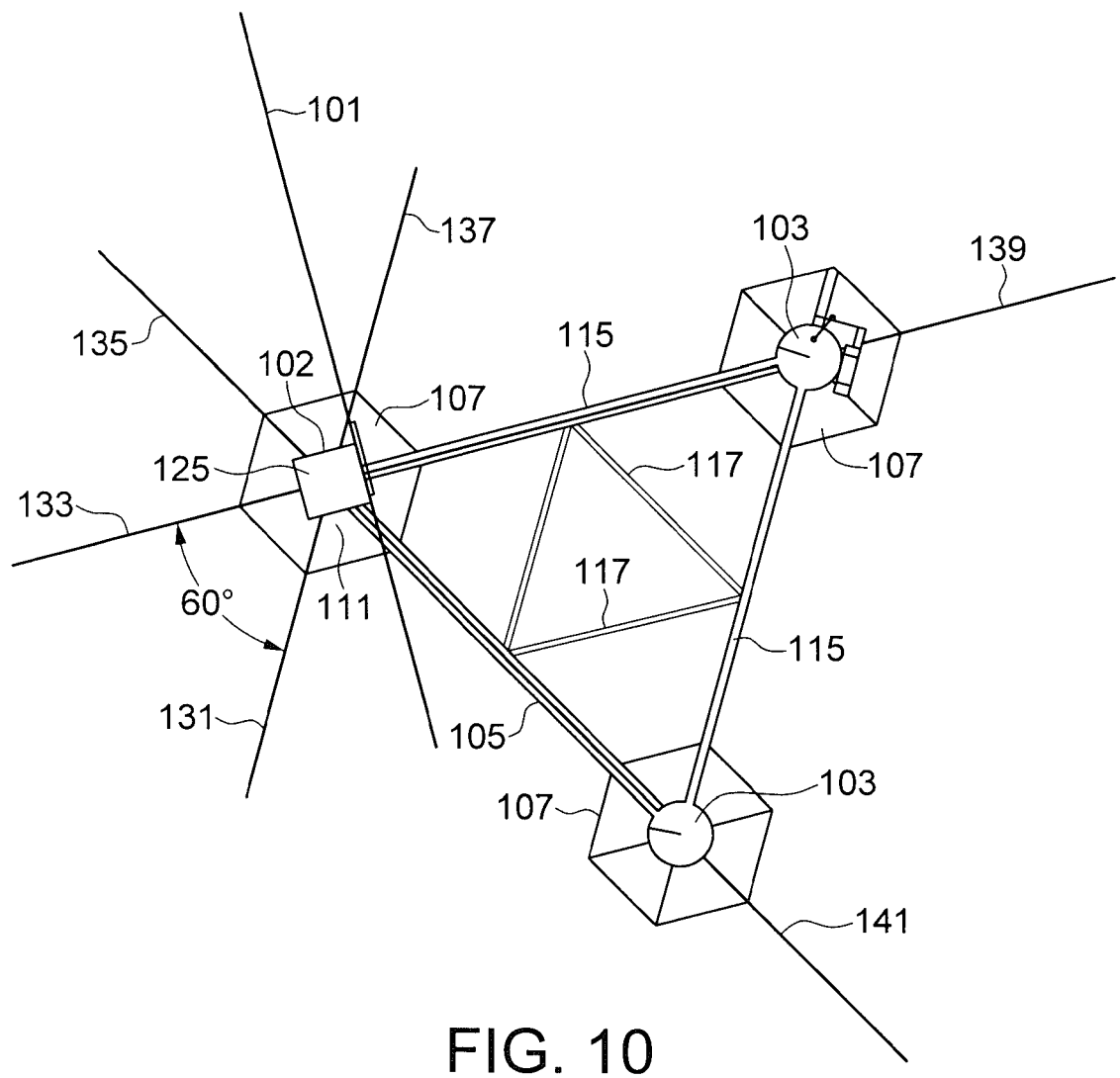
FIG. 10 illustrates a top view of the asymmetric semi submersible floating wind turbine platform.

With reference to FIG. 10, a top view of the floating wind turbine platform 105 is shown. In order to keep the floating wind turbine platform within a desired location, the platform 105 can be anchored to the seabed using conventional mooring lines. For example, in one embodiment, the floating wind turbine platform is secured to the sea floor with an asymmetric mooring system. In FIG. 10, six mooring lines 131-141 are illustrated. Four mooring lines 131-137 are connected to the column 102 that carries the wind turbine 125, and single mooring lines 139-141 are connected to each of the other columns 103. The angular separation of the mooring lines 131-141 is approximately 60 degrees between each adjacent line. The lines 131-141 converge toward a point located at the center of the column 102 supporting the wind turbine 125. The wind will also cause tension in the windward mooring lines connected to the windward columns to be higher than the tension in the remaining lines.

Figure 11:
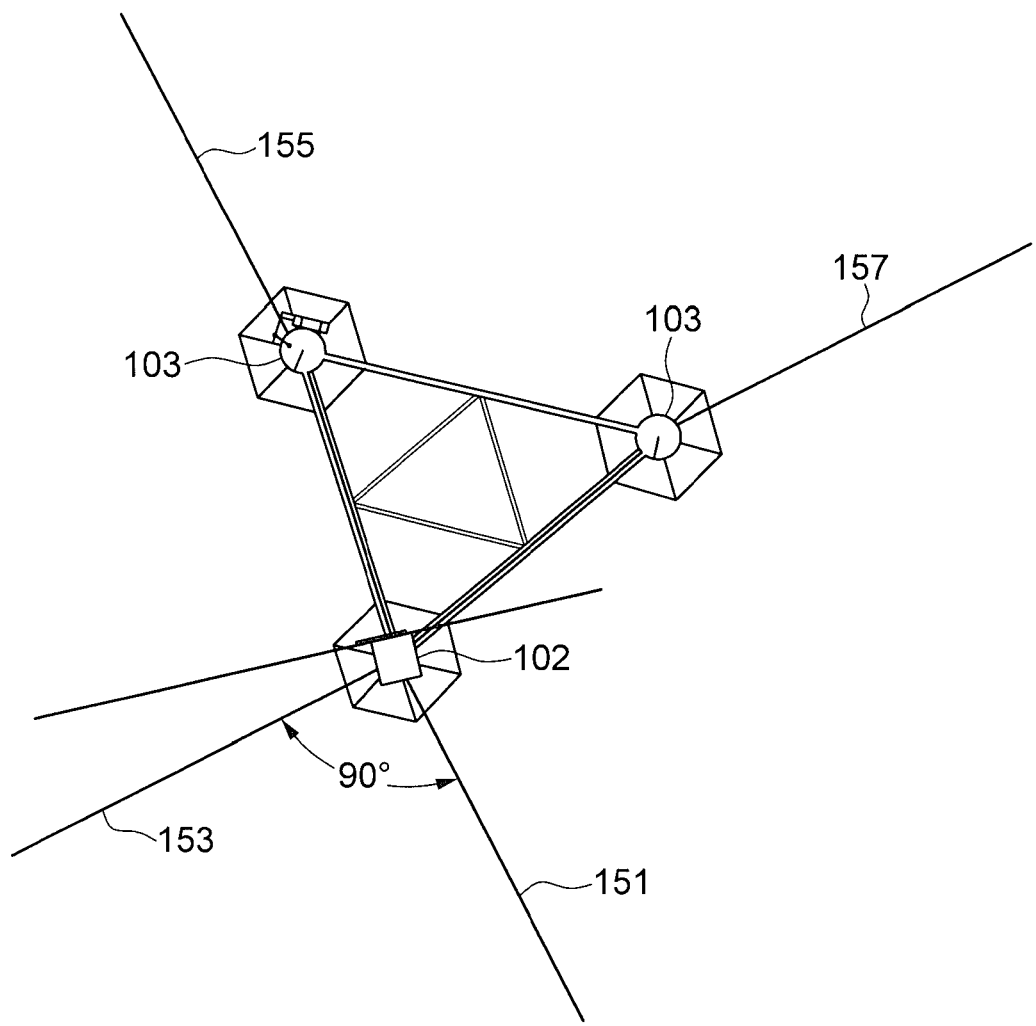
FIG. 11 illustrates a top view of the asymmetric semi submersible floating wind turbine platform.

With reference to FIG. 11, a top view of the floating wind turbine platform 105 having an alternate mooring configuration is shown. In this embodiment, four mooring lines 151-157 are used to secure the platform in place. Two lines 151, 153 are coupled to the column 102 supporting the tower 111, and the moorings 155, 157 are each coupled to one of the other columns 103. In this embodiment, the mooring lines 151-157 are separated from each other by an angle of about 90 degrees.

Figure 12:
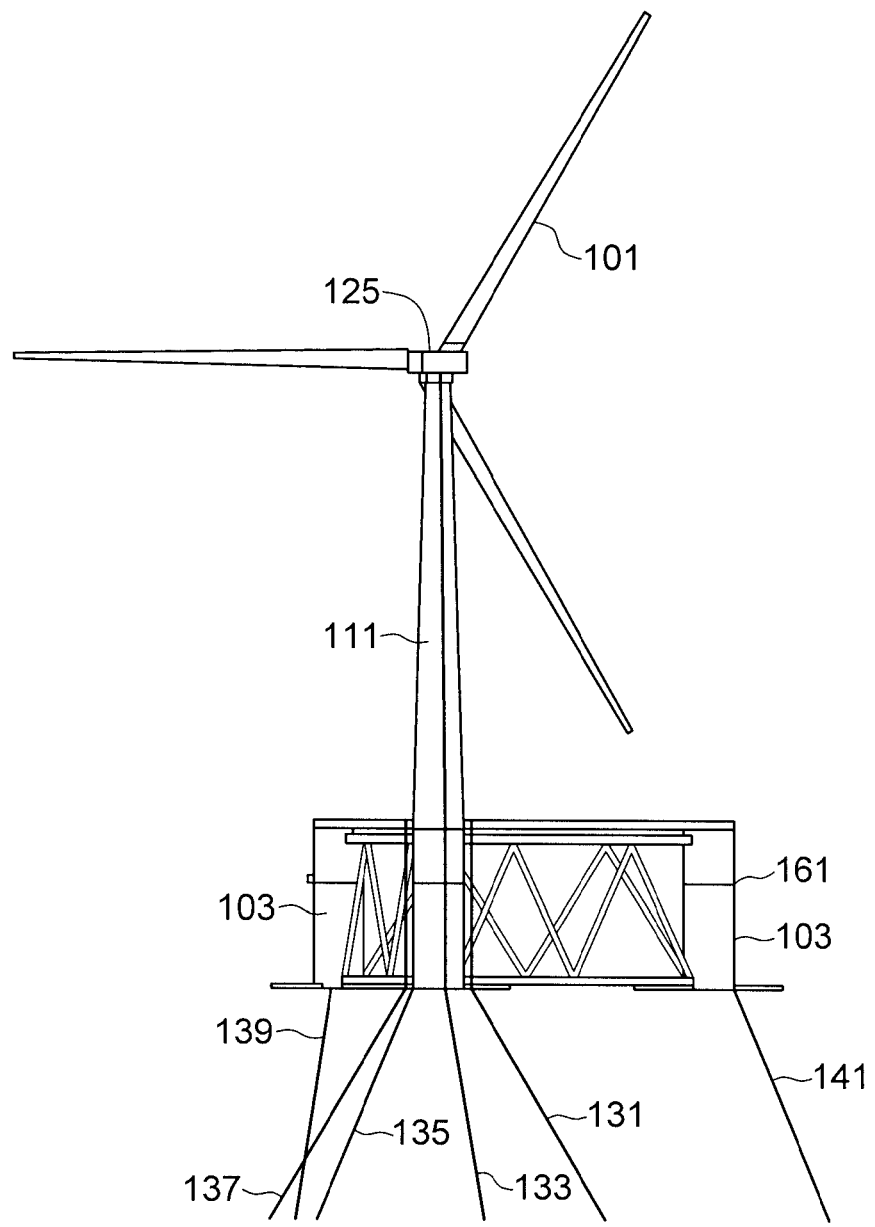
FIG. 12 illustrates an elevation view of the semi submersible floating wind turbine platform with a taut mooring line system.

With reference to FIG. 12, an elevation of and embodiment of a floating wind turbine platform 105 as described herein is shown. In the configuration shown in FIG. 12, each mooring line 131-141 is angled down and outward from the floating wind turbine platform 105 to the seabed and individually secured and tensioned. The mooring lines 131-141 can be tensioned so that the buoyancy of the columns 102, 103 provides an equal tension on each of the lines 131-141 when there is no wind. When the wind blows against the tower 111 and the turbine blades 101, the wind loading forces will be transferred to the mooring lines 131-141 and the windward lines holding the structure against the wind will be under more tension than the downwind lines. The lines 131-141 can be tensioned so the mooring lines do not rest on the seabed at any time and so that they extend in a substantially straight path. In an alternative configuration, the mooring lines may be arranged in a similar asymmetric pattern around the platform but only be tightened to a specific semi-taut tension force so the lines extend in a curved path to the sea floor. With a semi-taut tension system, the mooring lines do not rest on the seabed in their static equilibrium position with no wind, waves or current.

Figure 13:
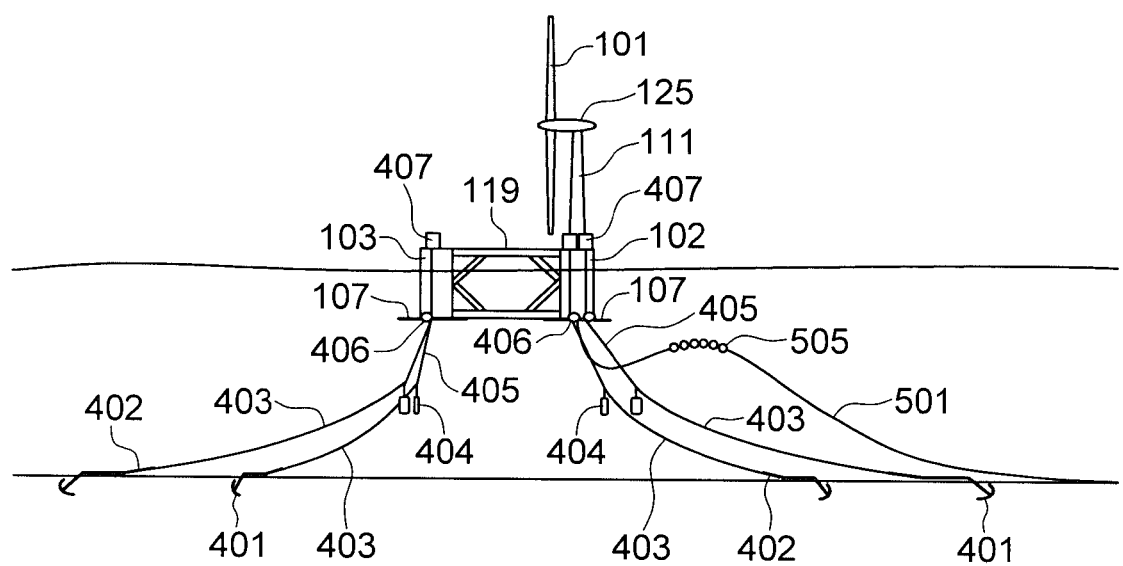
FIG. 13 illustrates an elevation view of the semi submersible floating wind turbine platform with a catenary mooring lines system.

In yet another embodiment, illustrated in FIG. 13, the structure 105 can be secured in place with a catenary mooring system with chain lines 402 laying on the sea floor. The mooring lines may comprise any suitable material, such as, for example, metal chain, wire, polyester or combinations thereof. In this example, high-holding power drag embedment anchors 401 are placed into the seabed. The anchors 401 are attached to sections of heavy chain 402 that lay on the seabed. The horizontal orientation of the chain 402 helps to keep the anchors 401 secured within the seabed. The chain 402 is connected to a long length of polyester line 403 which provides most of the length of the mooring. The polyester line 403 provides adequate stretch to the mooring line to prevent high tension spikes from being transmitted from the platform 105 to the anchor 401. The polyester line 403 is coupled to another length of chain 405 that is attached to the platform 105. The polyester line 403 remains suspended in the water and never comes in contact with the seabed after installation. Clump weights 404 may be placed at the junction between the chain 405 and the polyester line 403 creating a sharper bend in the mooring to further reduce tension spikes and ensure that the line 403 pulls horizontally on the anchor 401. The clump weights 404 are typically composed of dense materials, such as steel and concrete and are attached to the bottoms of the top chains 405. The weigh of the clump weight 404 in water is significantly larger than the weight of the chain 405 to which it is attached.

The chains 405 may pass through the columns 102, 103 to tensioning devices 407 which allow the mooring line tensions to be individually adjusted. The tensioning devices 407 can be, for example, chain jacks, windlasses, winches or other tensioning devices that are mounted at the top of, along or inside columns 102, 103. In order to prevent damage from chafing, fairleads or bending shoes 406 can be positioned at the bases of the columns 102, 103 that allow the passage of the mooring lines through the water-entrapment plates 107. After the tension has been properly set, the mooring lines can be locked.

Figure 15:
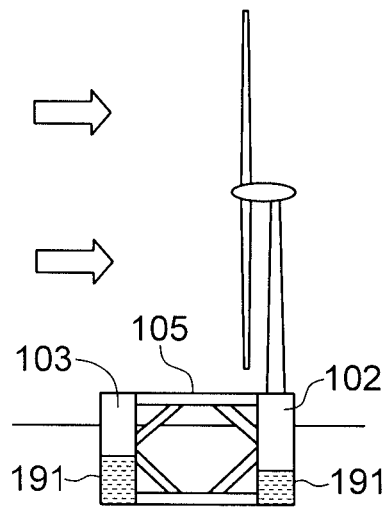
FIGS. 15-17 illustrate an elevation view of the floating wind turbine platform reacting to changes in wind velocity.

The wind turbine is typically designed to operate over a normal range of wind speeds and directions. The wind blowing against the turbine blades 101 and tower 111 will create a drag force that will tend to cause the floating wind turbine platform 105 to lean away from the wind direction. If the wind is coming from between columns 102 onto column 103, in the direction as shown in FIG. 15, the torque caused by the turbine blades 101 and the tower 111 will tend to push the downwind column 102 into the water and lift the upwind columns 103 out of the water. Since the wind does not always blow in the same direction, as already described herein, the wind turbine can be equipped with a yaw mechanism that allows the nacelle 125, hub and blades 101 to rotate about the top of the tower 111 into alignment with the wind. However, as the wind direction changes, the direction that the tower 111 leans will also change. The horizontal line 161 in FIG. 12 on the columns 102, 103 indicates the designed floatation water line. As the wind speed and direction change, the wind turbine may utilize an internal active ballast system to counteract the wind induced forces and moments and keep the structure 105 at the design floatation water line 161 under all steady operating conditions.

Figure 14:
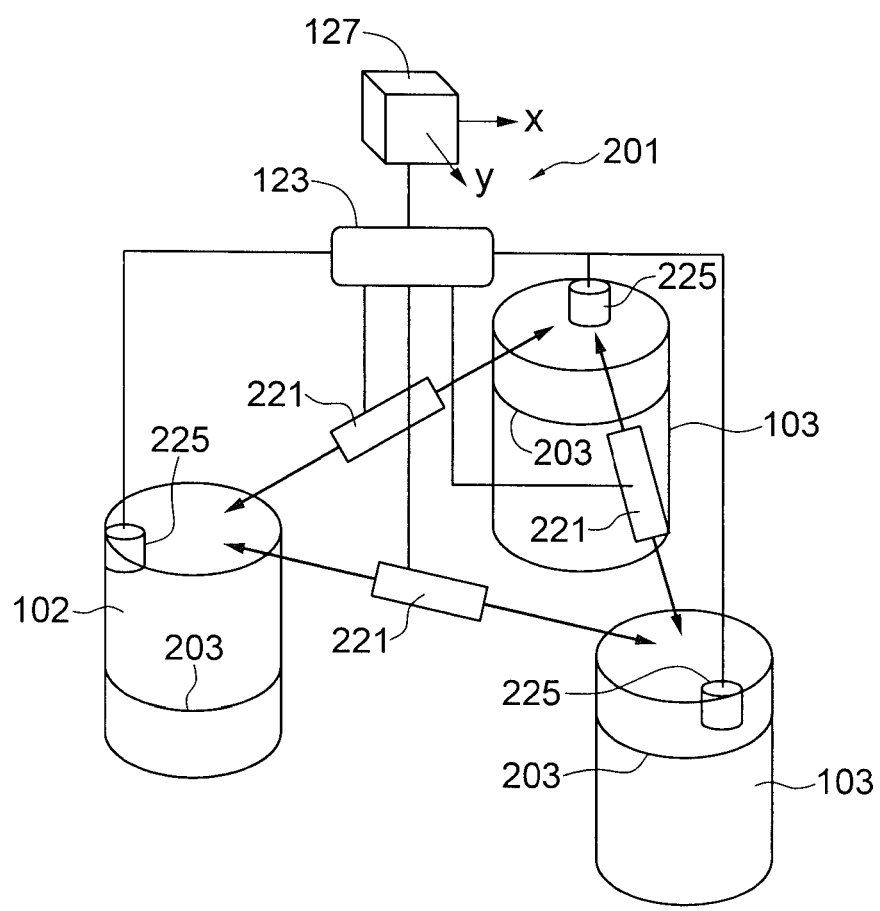
FIG. 14 illustrates a diagram of the ballast control system.

Therefore, a wind turbine platform as described herein can include an internal active ballast system. An example of such a system is described and illustrated with reference to FIG. 14. In such an embodiment, the columns 102, 103 are hollow and house an active ballast system 201 that transfers water between tanks within the columns 102, 103 to keep the platform 105 in a vertical upright alignment for optimum power conversion efficiency. For example, when the wind is blowing towards the tower column 102, a sensor 127 can detect the rotation of the wind turbine. The sensor 127 is coupled to a controller 123 that controls the pumps 221 to remove water from the tower column 102 to increase the buoyancy and add water into the other columns 103 to increase their weight. In an embodiment, there can be multiple pumps in each column controlling an independent water path to the other columns. Industrial axial flow water pumps are available from Huyundai, South Korea and Glynwed AS, Denmark.

The controller can also adjust the water volumes in the columns 103 that do not support the turbine tower 111 to adjust the side-to-side angle of the wind turbine. In an embodiment, the columns have sensors 225 that detect the volume of water, represented in FIG. 14 by the different water depths 203 in each of the columns 102, 103. The active movement of the water ballast between columns 102, 103 compensates for the induced wind forces to keep the platform leveled. Because a substantial amount of water must be pumped between the columns 102, 103 the response time of the internal active ballast system may be between about 15 to 30 minutes. Since the response time may be fairly slow, the active ballast system will not typically be designed to eliminate the fast dynamic motions of the structure 105 due to waves and other fast acting forces. However, the platform is designed to withstand these forces without the benefit of the ballast system. The active ballast system is designed to keep the mean position of the platform horizontal and maximize energy production by keeping the turbine upright as much as possible.

In an embodiment, the active ballast system can be a closed loop system configured to prevent the possible flooding and sinking of the floating wind turbine platform 105 by completely isolating the water in the ballast system from the surrounding seawater. The active ballast system moves the contained water between the columns 102, 103 by electrical water pumps 221 that cause the water to flow through the main beams 115 mounted between each of the columns 102, 103. In such an embodiment, the surrounding sea water is never allowed into the active ballast system. The water in the active ballast system may be fresh water added at quayside before towing, or using a supply boat, to mitigate corrosion problems and other seawater related issues.

In an embodiment, the alignment sensor 127 includes gyroscopes mounted along the X axis and Y axis. The gyroscopes output a signal that represents the angular rate of rotation which can be in units of degrees per second. An integration of the angular rate of rotation will produce an angular position. Thus, the gyroscopes in the alignment sensor 127 can be used to measure variation in the alignment of the platform and tower. The X axis gyroscope is in the horizontal plane and can be aligned with center line of the floating wind turbine platform. The Y axis accelerometer is also in the horizontal plane but perpendicular to the X axis gyroscope. The trim angle $\theta$ is the angle to the structure about the Y axis and the list angle $\phi$ is the angle of the structure about the X axis. When the structure is perfectly aligned, the X and Y axis gyroscope will not detect any acceleration. However, if the structure leans in any direction, the X axis gyroscope will detect trim rotation and the Y axis gyroscope will detect list rotation. Based upon this information, the angle of rotation can be calculated using known mathematical equations.

Figure 16:
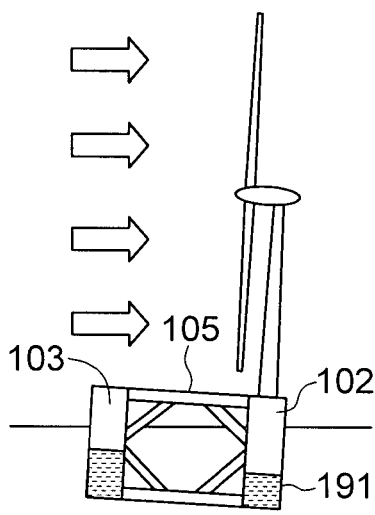
Figure 17:
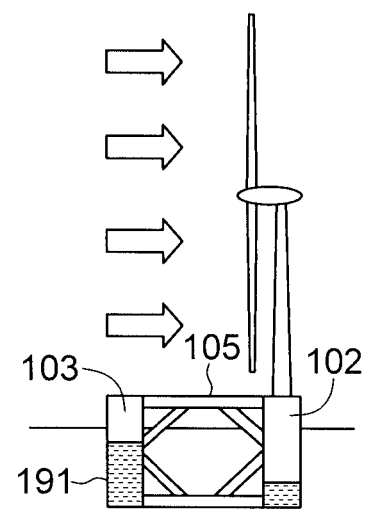

With reference to FIGS. 15-17, an example of how the active ballast system can react to variations in the wind velocity is illustrated. Based upon the alignment sensor signals, the ballast controller can control the pumps to adjust the water volume 191 within each of the columns 102, 103 to correct the vertical alignment angular offset. When the platform 105 is within the acceptable horizontal angle, the ballast system will stop moving water between the columns 102, 103.

In FIG. 15, the floating wind turbine platform 105 is illustrated in a vertical alignment with the wind blowing over the centerline of the platform 105. The water volume 191 within the cylinders 102, 103 has been properly adjusted for the wind, current wind velocity and wind direction. In FIG. 16 the wind velocity has increased and the increased wind force has caused the floating wind turbine platform 105 to rotate in pitch. The alignment sensor detects the trim rotation, and the controller actuates the pumps to move water from the tower supported column 102 to the other columns 103. In FIG. 17, the floating wind turbine platform 105 has returned to a horizontal alignment to compensate for the force induced by the increased wind velocity. Because there is less water volume 191 in the tower support column 102, there is more buoyancy at the tower end of the platform 105. Conversely, the higher volume of water 191 in the other columns 103 further assist in rotating the platform 105 in trim to an upright alignment.

Figure 18:
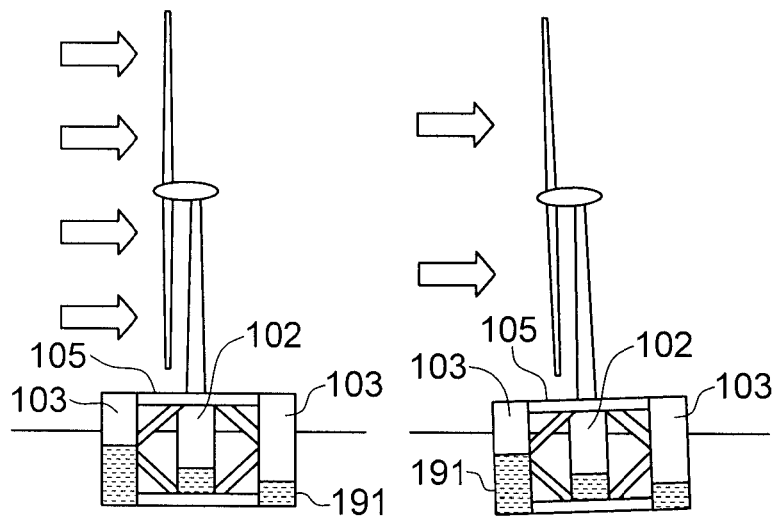
FIGS. 18-20 illustrate an elevation view of the floating wind turbine platform reacting to changes in wind velocity.
Figure 19:
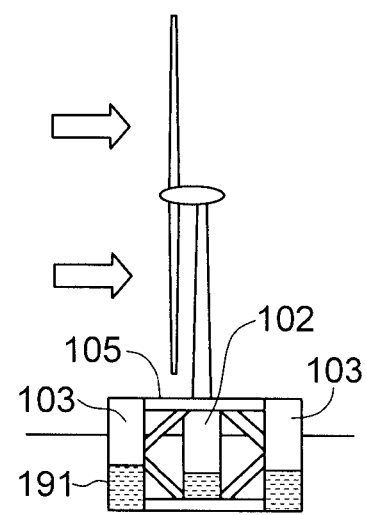
Figure 20:
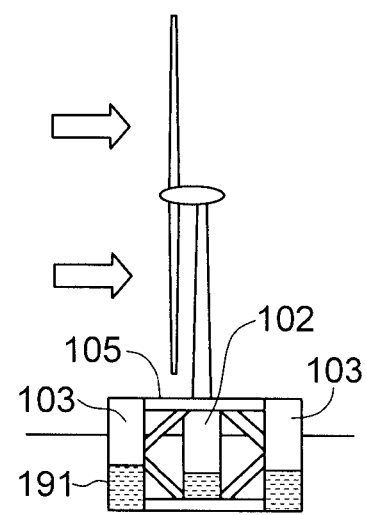

The active ballasting system will also adjust the water in the columns 102, 103 when the wind has shifted. With reference to FIGS. 18-20, the floating wind turbine platform 105 is illustrated with the wind blowing at a 90-degree shift from the platform centerline wind direction, with the wind coming over the left side of the platform 105. The active ballast system has moved water from the right side column tank 191 to the left column tank 191 and the platform 105 is substantially horizontal. With reference to FIG. 19, the wind velocity has dropped and the platform 105 has changed in its list angle. The alignment sensor detects the list angle of the platform 105 and the controller instructs pumps 221 to move water from the left column tank 191 to the right column tank 191. With reference to FIG. 20, the active ballast system has moved water from the left column tank 191 to increase the buoyancy and added more water to the right column tank 191 to increase the weight of the column. The platform 105 is again horizontal and the pumps have stopped until the alignment sensor detects another change in the platform alignment.

The floating wind turbine platforms described herein have different modes of operation based upon the ambient conditions. The platform can be permanently moored using an anchoring system made of a chain jack, chain and wire sections, and an anchor. In such an embodiment, the floating wind turbine platform will not be moved or disconnected from the moorings in case of extreme weather conditions. The main purpose of the floating wind turbine platform is to generate electricity, therefore it can be designed to maximize the amount of time the turbine is operational.

Since existing turbines stop operating at 25 m/s wind speed, it is desirable for the wave-induced motions typical of higher wind speeds not to interfere with this operational limit. That is, with reference to FIG. 6, as the structure moves due to the wave forces, the tower 111 rotates in trim which causes the top of the tower 111 to move horizontally and causes variations in the apparent wind against the turbine blades. If the structure 105 rotates into the wind, the top of the tower 111 will detect a faster wind speed and conversely if the structure 105 rotates away from the wind, the top of the tower 111 will detect a slower wind speed. A wind turbine platform as described herein reduces the rolling motion by utilizing water entrapment plates 107 fastened to the bottoms of the columns 102, 103, which resist vertical movement and dampen the roll and pitch movements of the platform 105.

Generally, there are three separate turbine blade regimes for the wind turbine delineated by the wind speed. In the first regime at wind speeds lower than 12 meters per second, the blades are optimized to maximize electricity production. In the second regime at wind speeds between 12 and 25 meters per second, the blades are actively rotated (pitched) to reduce the loading on the blades and maintain a constant optimal rotational velocity. In the third regime at wind speeds over 25 meters per second, the whole wind turbine is locked down, in a "survival" mode. In the lock down conditions, the turbine blades may be completely stopped and the blade angle is feathered to a minimal drag condition relative to the wind. Because the wind velocity and direction can change very quickly, the third regime may occur very quickly. Thus, the wind turbine must be able to quickly and accurately detect and respond to wind variations.

In addition to high wind shut down procedures, other conditions may trigger an emergency shutdown (ESD) which is intended to preserve the floating wind turbine platform and minimize the loss of equipment. Since the platform is normally unmanned, both automated and remote shut down procedures must be in place. Various system failure or error conditions will trigger the ESD. For example, a failure of the active ballast system can be detected by either a large mean list and or trim angles that do not diminish and/or abnormal power requirement of the pumps. Another system failure can be caused by a water leak in a column. This failure can be detected by a list or trim of the platform towards the leaking column, which cannot be compensated by the functioning active ballast system. The system should also be shut down if the turbine blades are subjected to stresses above a threshold level. This failure can be detected by strain gauges mounted on the blades. Another failure is the inability of the nacelle to rotate the turbine blades into the wind. This can be noted by a discrepancy between the measured wind direction and the nacelle heading. The system can also be shut down when there are power failures or a loss of communication between the floating wind turbine platform and the remote operator.

The wind turbine platforms described herein are designed to be economically fabricated, installed and commissioned/decommissioned. For example, in order to minimize construction costs, the structure can be designed to minimize welding at the assembly yard by providing large pre-assembled cylindrical sections of the columns, which can efficiently by fabricated in a workshop using automatic welding machines. The fabrication can be completed in the vicinity of a waterway that is deep enough to allow for the floating wind turbine platform to be towed. The tower, nacelle and turbine can be installed at quayside at a facility having a large crane. By installing all components at quayside, there is less cost and less risk of damage compared to placing the tower and turbine onto a floating platform in open water.

Figures 21, 22, 23:
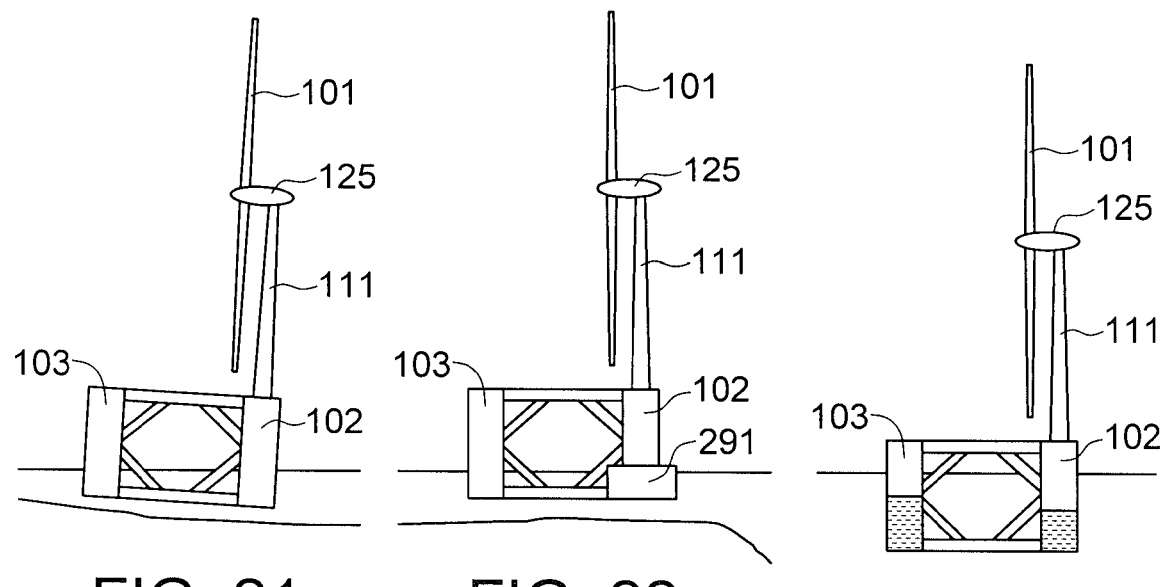
FIGS. 21-23 illustrate sequential steps for moving the floating wind turbine platform from quayside to deep water.

FIGS. 21-23 illustrate a method for towing the floating wind turbine platform 105 to the installation site from the fabrication site. With reference to FIG. 21, the tower 111, nacelle 125 and turbine blades 101 are fully assembled with the platform 105 at quayside during fabrication, and once completed, the platform 105 is towed to the installation site with a tugboat. Because most boat yards have a fairly shallow water channel, the water ballast can be removed from the columns 102, 103 so that the platform 105 assumes a minimum transit draft. The floating wind turbine platform 105 is stable at its transit draft. Since there is more weight supported by the tower column 102, this side of the platform 105 will normally have a deeper draft, which can be problematic if the water channel from the assembly facility is shallow.

With reference to FIG. 22, where needed, in order to correct the deeper draft of the tower column 102, a temporary buoyancy module 291 may be attached to the tower column 102, so each of the columns 102, 103 have the same minimum draft. In other embodiments, temporary buoyancy modules can be attached to the other columns 103 to further reduce the draft if necessary to float the platform 105 through a shallow channel.

With reference to FIG. 23, once the platform 105 is in deeper water, the buoyancy module is no longer needed and can be removed. The columns are then ballasted with water down to an even keel with a desired draft, such as, for example, a draft of approximately 50 feet (15 m). Although the deeper draft will increase the hydrodynamic drag, with the water ballasting the platform 105 is much more stable.

The transit route from the fabrication site to the installation site should be as short as possible. Thus, the location of the fabrication site can be project specific. This is especially important when a large offshore wind farm comprising multiple floating wind turbine units is being constructed and each hull has to be towed a long distance to the wind farm site. The selection of a suitable installation vessel is also fundamental to the wind farm project economics. The vessel used to tow the wind turbine should also be able to perform mooring installation and maintenance operations.

The quayside assembly has many advantages over systems that require assembly at the installation site. More specifically, fixed offshore wind foundations that are attached directly to sea floor require the turbine structure to be installed and maintained at the offshore installation site, which can be difficult and costly. Because it is very costly to disassemble, substantially all repairs must be done at the offshore installation site. In contrast, the floating platform configuration only requires deploying and connecting the mooring lines to the platform 105. In the case of an unexpected failure of the wind turbine, the installation sequence can be reversed, and the platform 105 towed back to a port for repairs.

The floating wind turbine platform also simplifies the offshore commissioning phase. The mooring system needs to be pre-laid and ready to be connected when the floating wind turbine platform is towed to the site. The wind turbine can be moored by an anchor-handling vessel. The mooring procedures can include recovering the messenger lines attached to the mooring lines from the platform and pulling in the chain section of the mooring line. The connection of the chain to the wire section of the line can be done above the water. The tensioning of the mooring lines can be done from the platform with chain jacks. Since the turbine is already installed, the procedure involved to start up the wind turbine is also much simpler and less expensive than a wind turbine that requires assembly on site.

Because the floating wind turbine platform is a dynamically moving structure, it is important to minimize the load forces applied to the power cables connecting the electrical generators to the power station. Once the floating wind turbine platform is properly moored, the prior-installed shore power cable can be connected to the floating wind turbine platform. With reference to FIG. 13, in an embodiment, a power cable 501 is coupled to the electrical switchboard on the platform 105. The cable runs down the length of the column 102 in a protective housing and exits near the bottom of the column 102. The switch gear can also be moved from the tower 111 to the deck 119. In this case the power cable will run down column 103. The sub sea cable 501 needs to be stable and protected with covering such as a sheath and/or trenching to prevent damage. Rather than running the cable 501 straight down to the sea floor, the cable 501 can be surrounded by a plurality of buoyancy mechanisms 505 to a portion of the cable 501 adjacent and below the lowest portion of the platform 105. This portion of the cable should be low enough in the water to prevent any potential contact with ships traveling in the area. Although the platform 105 is secured with mooring lines, it may not be absolutely fixed in place. The platform can move in response to various external forces, including high winds, strong current and rising/falling tides. The lazy wave buoyancy mechanisms 505 allow the cable 501 and platform 105 to move without any damage to the cable 501. From the lazy wave buoyancy mechanisms 505 the cable 501 runs to the sea floor and can be buried within the sea floor or a protective shell(s) may be placed around the cable 501.

Figure 24:
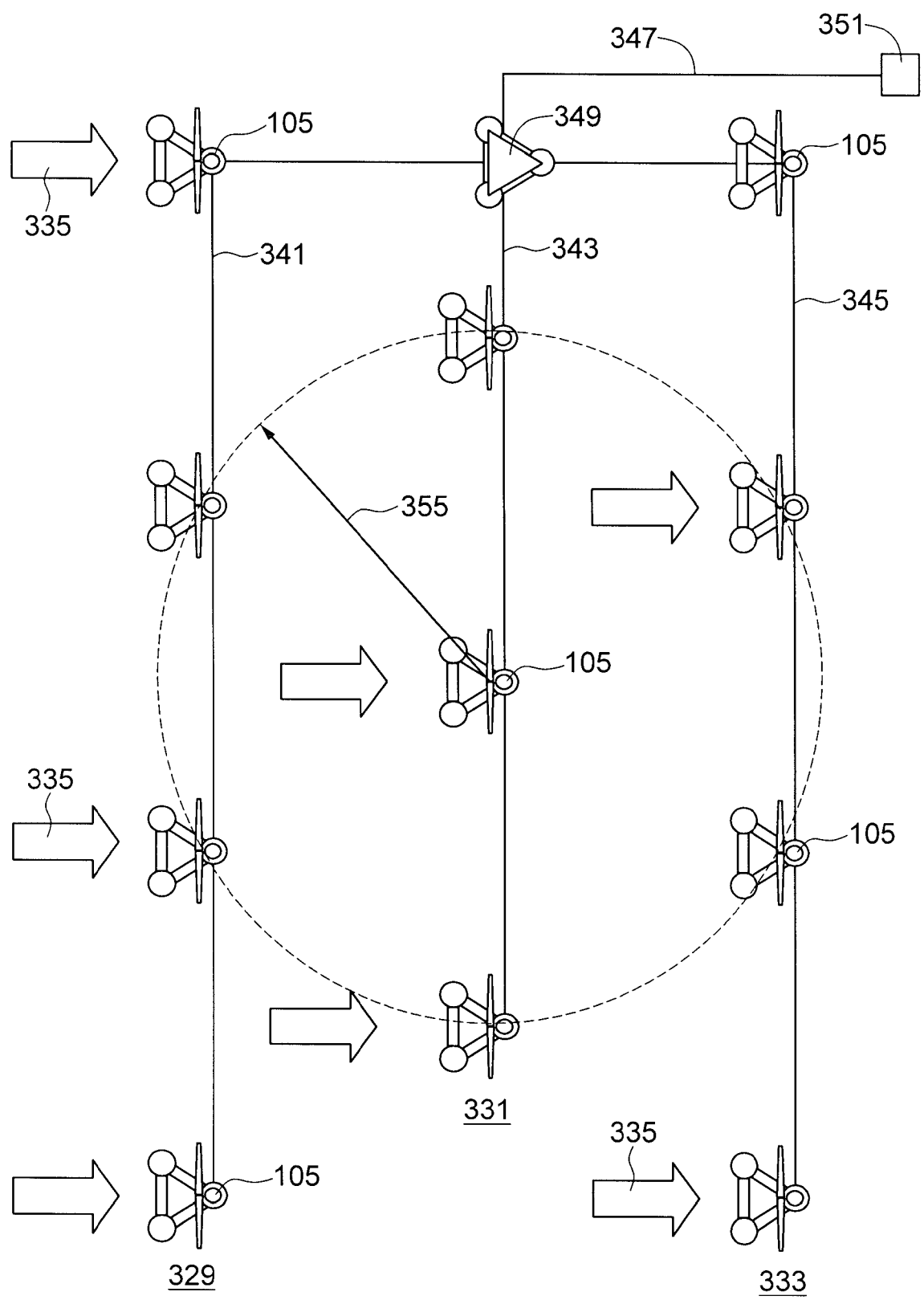
FIG. 24 illustrates an arrangement of a group of asymmetric semi submersible floating wind turbine platforms.

In an embodiment, a plurality of floating wind turbines platforms can be arranged in an array. With reference to FIG. 24, an exemplary arrangement of asymmetric floating wind turbines platforms 105 in a "wind farm" is illustrated. Since the wind velocity is reduced and made turbulent when it flows through a wind turbine, in one embodiment, the wind turbines are separated by a radius 355 of about 10 wind turbine rotor diameters or more and arranged in multiple staggered lines 329, 331, 333 that are perpendicular to the most frequent wind direction 335. In the illustrated embodiment, the wind turbines 105 are equally separated from six adjacent wind turbines 105 by 10 turbine diameters. Because of the staggered configuration, the wind blowing between two floating wind turbines platform 105 in the first row 329 will have a clear path to the floating wind turbines platforms 105 in the second row 331. This wind path will be clear even if the wind direction has shifted up to 30 degrees away from the preferred direction. The floating wind turbines platform 105 in the third row 333 may be in line with the floating wind turbine platforms 105 in the first row 329, however, since there is a separation of about 17 turbine rotor diameters, the loss of power due to up wind turbulence is negligible. Even if the wind direction shifts to an angle that aligns the adjacent floating wind turbine platforms 105, a 10 turbine rotor diameter separation will only have a minimal effect on power output.

In order to minimize the electrical power cables used by the floating wind turbine platforms 105, a first cable 341 couples the floating wind turbine platforms 105 in the first row 329, a second cable 343 couples the floating wind turbine platforms 105 in the second row 331 and a third cable 345 couples the floating wind turbine platforms 105 in the third row. The three cables 341, 343, 345 are then connected to a fourth cable 347 that transfers all of the electrical power to a power station 351, which distributes the electrical power as necessary. In an embodiment, one of the platforms 349 can be used as a power distribution unit and provide for crew and maintenance quarters. This can provide a safe sheltered area where workers can live temporarily and be protected from severe ambient weather conditions.

In another embodiment, individual cables from each turbine are coupled to a junction box on the seabed. There can be a certain number of connections per junction box. Larger cables from all the connection boxes are coupled to a main hub, which is connected to shore using a single power line. Redundant cables in case of failure can be added to the power grid infrastructure.

Figure 1:
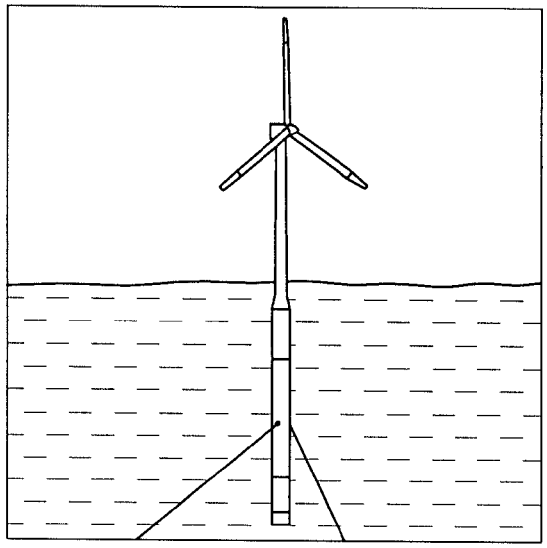
FIG. 1 illustrates a spar type floating wind turbine platform.
Figure 2:
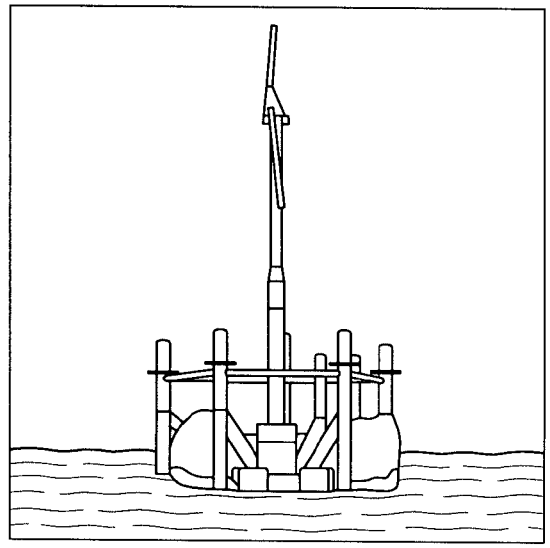
FIG. 2 illustrates a tension leg floating wind turbine platform.
Figure 3:
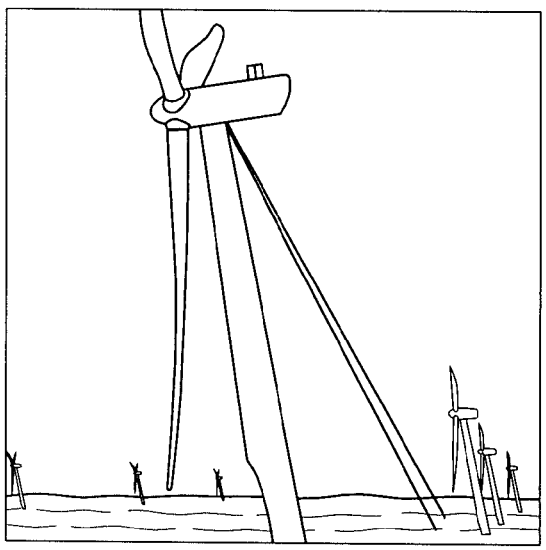
FIG. 3 illustrates a tension leg/spar floating wind turbine platform.
Figure 4:
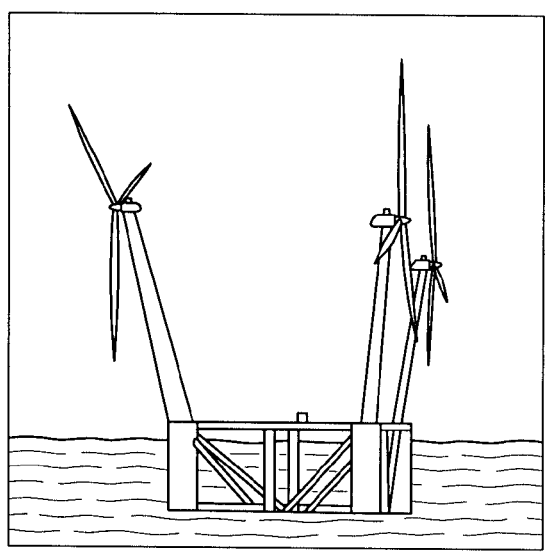
FIG. 4 illustrates a symmetric semi submersible floating wind turbine platform.
Figure 5:
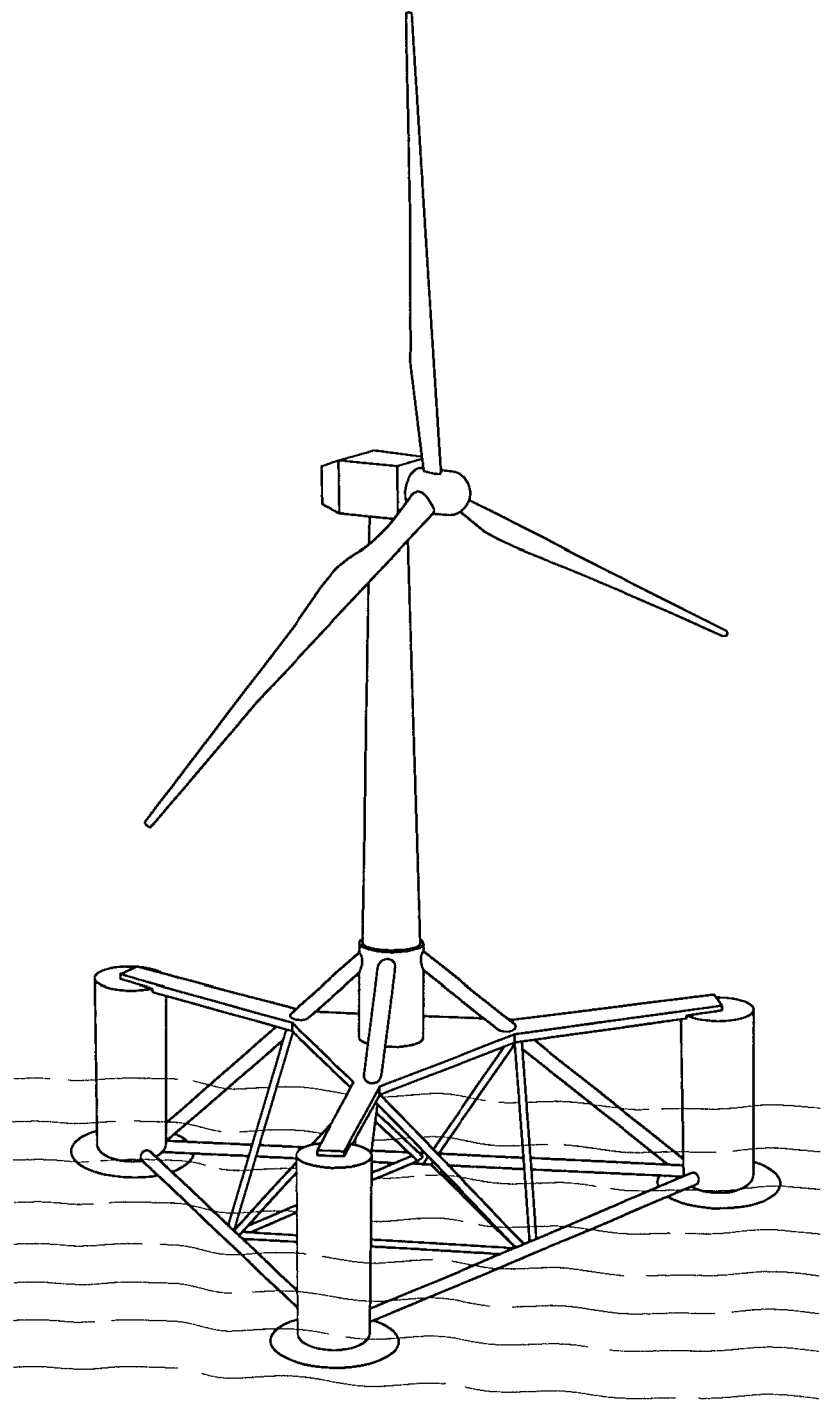
FIG. 5 illustrates a perspective view of an asymmetric semi submersible floating wind turbine platform.

In certain, specific embodiments, a difference between the wind turbine platforms described herein and those known in the art is the asymmetric configuration of the turbine tower that is mounted directly over one of the columns. This configuration keeps the majority of the wind turbine mass at the outer edges of the structure rather at the center of the structure. For example, the "Force Technology WindSea" floating wind turbine structure illustrated in FIG. 4, has three towers and turbine blades that are each mounted on a different cylinder. As discussed above, it is well known that efficiency of the wind turbine is reduced when there is turbulence caused by other closely spaced turbine blades. The turbulence and uneven air flow can also induce vibration into the wind turbine system which can prevent the normal operation of the wind turbines. The asymmetric wind turbine platform described herein prevents these problems by utilizing a single tower and turbine blade configuration. Another prior art floating wind turbine system is the "Tri-Floater" illustrated in FIG. 5, illustrates a tower mounted at the center of three columns. In order to support this weight, a substantial amount of material is required at the center of the structure. This increases the fabrication time, cost and material required to produce this floating wind turbine platform design and increases the weight at the center of the structure. By placing much of the mass at the center rather than at the outer edges less inertial force is required to cause the floating wind turbine platform to roll. In contrast, the asymmetric floating wind turbine platform described herein simplifies the construction by mounting all of the wind turbine components over one of the columns so that additional support structures are not required. Also, by moving the mass outward in such an embodiment, the inertial stability is improved.

A single tower mounted over one of the columns in the wind turbine platforms described herein leads to asymmetric loading of the platform, as the dominant force contribution, which in most conditions will come from the wind turbine, is applied to the corresponding column, as opposed to near the center of mass of the platform. An asymmetric mooring system can be used with these asymmetrically loaded platforms, wherein the number of mooring lines connected to the column with the tower is substantially larger than the number of lines connected to the other columns.

As wind turbine technology improves, the size of the wind turbine has increased. In one embodiment, a wind turbine platform as described herein is intended to support a 400 foot diameter wind turbine rotor that drives a 5 mega watt electrical generator. The estimated component weights for this wind turbine are listed below in Table 1.

TABLE 1

| Component | Mass in Short Tons | Mass in Metric Tons |
| --- | --- | --- |
| Rotor | 120 | 130 |
| Nacelle | 250 | 280 |
| Tower | 380 | 420 |
| Columns | 2500 | 2800 |
| Ballast water | 4000 | 4500 |

The estimated sizes of the components of a wind turbine platform supporting a 5 mega watt electrical generator are listed below in Table 2. In other embodiments, the weights and sizes of the floating wind turbine platform components can be substantially different than the values listed in Tables 1 and 2.

TABLE 2

| Component | Dimension in Feet | Dimension in Meters |
| --- | --- | --- |
| Tower diameter | 26.25 | 8 |
| Tower height | 300 | 91 |
| Rotor diameter | 400 | 126 |
| Clearance between column and turbine blade | 16.4 | 5 |
| Distance between column centers | 200 | 61 |
| Water-entrapment plate width | 70 | 21 |
| Column diameter | 30 | 9 |
| Column height | 100 | 30 |
| Draft depth below water line at installation | 65 | 20 |
| Draft depth below water line quayside | 20 | 6 |

It will be understood that the inventive system has been described with reference to particular embodiments; however additions, deletions and changes could be made to these embodiments without departing from the scope of the inventive system. For example, the same processes described can also be applied to other devices. Although the systems that have been described include various components, it is well understood that these components and the described configuration can be modified and rearranged in various other configurations.

What is claimed is:
1. A floating wind turbine platform comprising:
 a) at least three stabilizing columns, each column having an upper and a lower end, and an internal volume for containing a ballast;
 b) a tower having an upper end and a lower end that is coupled to the floating wind turbine platform;
 c) a turbine rotor coupled to an electrical generator, the turbine rotor and the electrical generator are mounted proximate to the upper end of the tower;
 d) main beams interconnected to the at least three stabilizing columns;

e) water-entrapment plates, each of the plates attached to the lower end of one of the stabilizing columns; and f) a ballast control system for moving the ballast between the internal volumes of the at least three stabilizing columns to adjust a vertical alignment of the tower;

wherein the tower is mounted in vertical alignment over one of the columns and the other columns are not directly under the tower, wherein the main beams comprise first, second, and third top main beams, and first, second, and third bottom main beams, and wherein the first top main beam extends between an upper end of the one of the columns over which the tower is mounted and an upper end of a first other column, the first bottom main beam is below the first top main beam and extends between a lower end of the one of the columns and a lower end of the first other column, the second top main beam extends between the upper end of the one of the columns and an upper end of a second other column, the second bottom main beam is below the second top main beam and extends between the lower end of the one of the columns and a lower end of the second other column, the third top main beam extends between the upper end of the first other column and the upper end of the second other column, and the third bottom main beam is below the third top main beam and extends between the lower end of the first other column and the lower end of the second other column.

2. The floating wind turbine platform of claim 1 further comprising: mooring lines that are asymmetrically coupled to the at least three stabilizing columns with at least one half of the mooring lines coupled to a tower supporting column.

3. The floating wind turbine platform of claim 1 wherein angles formed by a adjacent mooring lines are approximately equal.

4. The floating wind turbine platform of claim 1 wherein the tower is mounted over a buoyancy column that supports most of the weight of the tower and is located between the at least three stabilizing columns.

5. The floating wind turbine platform of claim 1 wherein the ballast control system comprises:
i) a processor for sending and receiving ballast control signals;
ii) a vertical alignment sensor in communication with the processor for detecting the vertical alignment of the tower relative to a gravitational force direction;
iii) a ballast pump in communication with the processor for moving a ballast between the internal volumes of the at least three stabilizing columns to adjust a vertical alignment of the tower.

6. The floating wind turbine platform of claim 5 wherein the ballast control system further comprises:
iv) ballast volume sensors for determining the amount of ballast contained within the internal volumes of the at least three stabilizing columns.

7. The floating wind turbine platform of claim 1 wherein a shape of a water-entrapment plate comprises a hexagon.

8. The floating wind turbine platform of claim 1 wherein a water-entrapment plate comprises:
first and second radial stiffeners extending from a stabilizing column;
first and second girders coupled between the first and second radial stiffeners; and
a plurality of stringers, spaced apart and coupled between the first and second girders, wherein openings are created between the spaced apart plurality of stringers.

9. The floating wind turbine platform of claim 1 wherein a diameter of the one of the columns over which the tower is mounted has a diameter equal to a diameter of at least one of the other columns.

10. The floating wind turbine platform of claim 1 wherein the ballast control system comprises:
a sensor to detect a rotation of the tower mounted over the one of the columns; and
a controller, coupled to the sensor, wherein upon the rotation being detected by the sensor, the controller directs the transfer of ballast from an internal volume of the one of the columns over which the tower is mounted to an internal volume of at least one of the other columns.

11. The floating wind turbine platform of claim 1 wherein the ballast control system is a closed loop system.

12. The floating wind turbine platform of claim 1 comprising:
a top set of three bracing beams, each end of a bracing beam of the top set of bracing beams being coupled to an end of another bracing beam of the top set of bracing beams,
wherein the top set of three bracing beams is coupled to the first top main beam, the second top main beam, and the one of the columns over which the tower is mounted.

13. The floating wind turbine platform of claim 1 comprising:
a bottom set of three bracing beams, each end of a bracing beam of the bottom set of bracing beams being coupled to an end of another bracing beam of the bottom set of bracing beams,
wherein the bottom set of three bracing beams is coupled to the first bottom main bean, the second bottom main beam, and the one of the columns.

14. A floating platform comprising:
a) at least three stabilizing columns, each column having an upper and a lower end, and an internal volume for containing a ballast;
b) main beams interconnecting the at least three stabilizing columns;
c) water-entrapment plates, each of the plates is attached to the lower end of one of the stabilizing columns; and
d) a ballast control system that moves the ballast between the internal volumes of the at least three stabilizing columns to adjust a vertical alignment of the at least three stabilizing columns;
wherein one of the columns supports more weight than the other columns, and
wherein the main beams comprise first, second, third, fourth, fifth, and sixth main beams,
the first main beam and the second main beam connect the one of the columns that supports more weight than the other columns and a first other column,
the third main beam and the fourth main beam connect the one of the columns and a second other column, and
the fifth main beam and the sixth main beam connect the first other column and the second other column.

15. The floating platform of claim 14 further comprising:
horizontal bracing beams that are each coupled between the main beams that are adjacent to each other.

16. The floating platform of claim 15 wherein three of the main beams form sides of an equilateral triangle and portions of the main beams and the horizontal bracing beams form equilateral triangles.

17. The floating platform of claim 14 further comprising:
vertical bracing beams that are each coupled between one of the main beams and one of the columns.

18. The floating platform of claim 14 wherein the ballast control system comprises:
  i) a processor for sending and receiving ballast control signals;
  ii) a vertical alignment sensor in communication with the processor for determining the vertical angle of the at least three stabilizing columns relative to a gravitational force direction;
  iii) a ballast pump in communication with the processor for moving a ballast between the internal volumes of the at least three stabilizing columns to adjust the horizontal angle of the floating platform.

19. The floating platform of claim 18 wherein the ballast control system further comprises:
  iv) ballast volume sensors for determining the amount of ballast contained within the internal volumes of the at least three stabilizing columns.

20. The floating wind turbine platform of claim 14 wherein the first main beam is parallel to the second main beam, the third main beam is parallel to the fourth main beam, and the fifth main beam is parallel to the sixth main beam.

21. The floating wind turbine platform of claim 14 comprising:
  a plurality of top bracing beams, wherein each top bracing beam connects one of the first, third, or fifth main beams to another of the first, third, or fifth main beams; and
  a plurality of bottom bracing beams, wherein each bottom bracing beam connects one of the second, fourth, or sixth main beam to another of the second, fourth, or sixth main beam.

22. The floating wind turbine platform of claim 14 comprising:
  a plurality of bracing beams, wherein each bracing beam connects one of the first, second, third, fourth, fifth, or sixth main beams to one of the at least three stabilizing columns.

23. A method of deploying a semi-submersible platform comprising:
  assembling at quayside the semi-submersible platform having a plurality of columns each containing ballast mechanisms;
  installing at quayside a tower assembly that includes a turbine rotor coupled to an electrical generator, on the semi-submersible platform;
  removing a ballast from the columns;
  moving the semi-submersible platform from shallow water at quayside into deep water more than 100 feet in depth;
  partially filling the columns with a ballast to stabilize when the semi-submersible platform is in the deep water;
  mooring the semi-submersible platform;
  detecting a floating angle of the semi-submersible platform that is outside a predetermined acceptable range; and
  operating the ballast mechanisms to correct the floating angle.

24. The method of claim 23 further comprising:
  attaching at quayside a ballast module to one or more of the columns so the semi-submersible platform assumes a transit draft depth; and
  removing the ballast module before the semi-submersible platform is moved to the deep water.

25. The method of claim 23 wherein the mooring of the semi-submersible platform includes attaching the semi-submersible platform to a plurality of mooring lines that are secured to the sea floor and attached to the buoyancy structures in an asymmetric pattern.

26. The method of claim 25 further comprising:
  connecting the generator to an electrical cable coupled to a power station;
  rotating the turbine rotor to cause the electrical generator to produce electrical power; and
  transmitting the electrical power through the electrical cable to the power station.

27. A method of operating a floating wind turbine platform comprising:
  a) providing the floating wind turbine platform apparatus having at least three stabilizing columns, each column having an upper and a lower end, and an internal volume for containing a ballast, a tower coupled to the floating wind turbine platform, a turbine rotor mounted on an upper portion of the tower, the turbine rotor coupled to an electrical generator, main beams interconnecting the at least three stabilizing columns, water-entrapment plates attached to the lower ends of the stabilizing columns and a ballast control system that includes a vertical alignment sensor and one or more pumps for moving the ballast between the internal volumes of the at least three stabilizing columns;
  b) rotating the turbine rotor;
  c) rotating the generator to produce electricity;
  d) detecting a list angle of the floating wind turbine platform that is outside a predetermined acceptable range;
  e) actuating one or more pumps to move the ballast between the stabilizing columns;
  f) detecting the list angle of the floating wind turbine platform that is within the predetermined acceptable range;
  g) stopping the one or more pumps to stop the movement of the ballast between the stabilizing columns.

28. The method of claim 27 further comprising:
  controlling a yaw position of turbine rotor based on a detected wind direction; and
  controlling the pitch of the turbine rotor based upon a detected wind velocity.

29. The method of claim 28 further comprising:
  adjusting the pitch of the turbine rotor to maximize electrical output from the generator when the wind velocity is less than 12 meters per second.

30. The method of claim 28 further comprising:
  adjusting the pitch of the turbine rotor to maintain a constant rotational velocity when the wind velocity is between about 12 to 25 meters per second.

31. The method of claim 28 further comprising:
  adjusting the pitch of the turbine rotor to minimize wind forces on the turbine rotor; and
  stopping the turbine rotor when the wind velocity exceeds 25 meters per second.

* * * * *